US010820031B2

(12) United States Patent
Furuya et al.

(10) Patent No.: US 10,820,031 B2
(45) Date of Patent: Oct. 27, 2020

(54) COMMUNICATION APPARATUS FOR SWITCHING BETWEEN A LOW-RATE STREAM AND A HIGH-RATE STREAM

(71) Applicant: SONY CORPORATION, Tokyo (JP)

(72) Inventors: Takahiro Furuya, Kanagawa (JP); Hiroyuki Fukada, Kanagawa (JP); Kazumi Munekata, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/769,957

(22) PCT Filed: Oct. 19, 2016

(86) PCT No.: PCT/JP2016/004633
§ 371 (c)(1),
(2) Date: Apr. 20, 2018

(87) PCT Pub. No.: WO2017/081843
PCT Pub. Date: May 18, 2017

(65) Prior Publication Data
US 2018/0316956 A1    Nov. 1, 2018

(30) Foreign Application Priority Data
Nov. 11, 2015 (JP) .................................. 2015-221559

(51) Int. Cl.
*H04N 7/173* (2011.01)
*H04N 21/2662* (2011.01)
(Continued)

(52) U.S. Cl.
CPC ..... *H04N 21/2662* (2013.01); *H04L 65/4092* (2013.01); *H04L 65/601* (2013.01);
(Continued)

(58) Field of Classification Search
CPC .......... H04N 21/2662; H04N 21/2365; H04N 21/6405; H04N 21/6408
See application file for complete search history.

(56) References Cited

U.S. PATENT DOCUMENTS 8,869,203 B2 * 10/2014 Marshall ............ H04N 5/44591
348/143
2005/0071876 A1    3/2005 Van Beek
(Continued)

FOREIGN PATENT DOCUMENTS

EP         1521476 A1    4/2005
JP      2005-110267 A    4/2005
(Continued)

OTHER PUBLICATIONS

International Search Report and Written Opinion of PCT Application No. PCT/JP2016/004633, dated Jan. 17, 2017, 09 pages of ISRWO.

*Primary Examiner* — Gigi L Dubasky
(74) *Attorney, Agent, or Firm* — Chip Law Group

(57) ABSTRACT

Provided is a communication apparatus including: an encoder with a plurality of channels configured to encode an input stream while switching a rate of output data in at least two stages; and a wireless communication apparatus that transfers output of the encoder to a terminal by way of a wireless communication network, in which, when a channel is selected at the terminal, output of the encoder is switched from a low-rate stream to a high-rate stream such that the high-rate stream is transmitted to the terminal at which the channel has been selected.

13 Claims, 33 Drawing Sheets

(51) Int. Cl.
- *H04N 21/6405* (2011.01)
- *H04N 21/6408* (2011.01)
- *H04N 21/4363* (2011.01)
- *H04N 21/426* (2011.01)
- *H04N 21/6373* (2011.01)
- *H04N 21/2381* (2011.01)
- *H04N 21/438* (2011.01)
- *H04N 21/2343* (2011.01)
- *H04N 21/222* (2011.01)
- *H04N 21/414* (2011.01)
- *H04L 29/06* (2006.01)
- *H04N 21/2365* (2011.01)
- *H04N 21/61* (2011.01)

(52) U.S. Cl.
CPC ....... *H04N 21/222* (2013.01); *H04N 21/2365* (2013.01); *H04N 21/2381* (2013.01); *H04N 21/23439* (2013.01); *H04N 21/41407* (2013.01); *H04N 21/41422* (2013.01); *H04N 21/4263* (2013.01); *H04N 21/4383* (2013.01); *H04N 21/43637* (2013.01); *H04N 21/6112* (2013.01); *H04N 21/6373* (2013.01); *H04N 21/6405* (2013.01); *H04N 21/6408* (2013.01)

(56) References Cited

U.S. PATENT DOCUMENTS

| | | | |
|---|---|---|---|
| 2007/0195737 A1* | 8/2007 | Walker | H04H 20/26 370/335 |
| 2010/0150252 A1* | 6/2010 | Camp, Jr. | H04L 65/4015 375/240.27 |
| 2011/0119711 A1* | 5/2011 | Marshall | H04N 5/44591 725/41 |
| 2012/0198506 A1* | 8/2012 | Joe | H04N 21/44209 725/97 |
| 2014/0189751 A1* | 7/2014 | Deiss | H04H 60/82 725/59 |

FOREIGN PATENT DOCUMENTS

| | | |
|---|---|---|
| JP | 3772830 B2 | 5/2006 |
| JP | 2006-253882 A | 9/2006 |
| JP | 2006-332854 A | 12/2006 |
| JP | 2013-038513 A | 2/2013 |

* cited by examiner

STREAMING SERVER STATE TRANSITION DIAGRAM

LOW-RATE HIERARCHICAL STREAMING START PROCESSING

COMMUNICATION APPARATUS FOR SWITCHING BETWEEN A LOW-RATE STREAM AND A HIGH-RATE STREAM

CROSS REFERENCE TO RELATED APPLICATIONS

This application is a U.S. National Phase of International Patent Application No. PCT/JP2016/004633 filed on Oct. 19*, 2016, which claims priority benefit of Japanese Patent Application No. JP 2015-221559 filed in the Japan Patent Office on Nov. 11, 2015. Each of the above-referenced application is hereby incorporated herein by reference in its entirety.

TECHNICAL FIELD

The present technology relates to a communication apparatus applied to broadcasting and portable wireless communication.

BACKGROUND ART

Recently, there has been proposed a broadcast receiving server equipped with a terrestrial digital broadcast tuner so as to be able to redistribute terrestrial digital broadcasting through a wireless local area network (wireless LAN). In the case of this apparatus, functions required for television viewing such as the responsiveness of tuning and the capability to allow viewing using many terminals are restricted due to transmission delay owing to wireless communication, band restriction for wireless communication, and the like. A system is conceivable in which a network using the wireless LAN is built in the home, in the car, and the like by removing the inconvenience of being restricted as mentioned above such that the digital broadcasting received by the broadcast receiving server is redistributed through the wireless LAN and a plurality of terminals is used at the same time to view television broadcasting. For example, a plurality of people can enjoy favorite television broadcast programs with their own terminals (smartphones, tablets, and the like) at the same time in a car.

Conventionally, it is proposed to provide a television tuner in a wireless base station for a mobile station to broadcast or multicast content of received digital broadcasting and information regarding an electronic program guide such that the mobile station receives this content and the information regarding the electronic program guide to allow viewing of the digital broadcasting (refer to Patent Document 1). Furthermore, with respect to reception of digital broadcasting on a mobile body, it has been proposed to enable reception of digital broadcasting for fixed use and digital broadcasting for the mobile body such that one type of the digital broadcasting is received according to circumstances (refer to Patent Documents 2).

CITATION LIST

Patent Document

Patent Document 1: Japanese Patent Application Laid-Open No. 2013-038513
Patent Document 2: Japanese Patent No. 3772830

SUMMARY OF THE INVENTION

Problems to be Solved by the Invention

It was confirmed that the following issues occurred in a system for viewing television broadcasting with a plurality of terminals at the same time.

Firstly, since streaming start processing (tuning, transcoding, forward error correction (FEC) processing, and the like) is necessary when a viewing channel is selected, it takes time to output an image and audio on the terminal from when the channel is selected and thus a waiting time until viewing the program occurs.

Secondly, transmission efficiency during streaming through the wireless LAN is reduced. In order to view television using unicast, data for each viewer is necessary and, when a plurality of people views the identical channel, data of the identical channel must be transferred by the number of people. As a consequence, the transmission efficiency is reduced. The above-mentioned Patent Document 1 and Patent Document 2 do not discuss any solution to such issues.

Accordingly, an object of the present technology is to provide a communication apparatus that can remove these issues.

Solutions to Problems

In order to solve the above-mentioned problem, the present technology provides a communication apparatus (server) including:

an encoder with a plurality of channels configured to encode an input stream while switching a rate of output data in at least two stages; and a wireless communication apparatus that transfers output of the encoder to a terminal by way of a wireless communication network, in which when a channel is selected at the terminal, output of the encoder is switched from a low-rate stream to a high-rate stream such that the high-rate stream is transmitted to the terminal at which the channel has been selected.

For example, the integrated services digital broadcasting-terrestrial (ISDB-T) broadcasting in Japan adopts a hierarchical transmission, where one-segment broadcasting is used as a low-rate hierarchy and full-segment broadcasting is used as a high-rate hierarchy. A stream sent in the one-segment broadcasting is the low-rate stream and a stream sent in the full-segment broadcasting is the high-rate stream.

In addition, the present technology provides a communication apparatus (terminal) including:

a wireless communication apparatus that receives a stream transferred from a server by way of a wireless communication network;

a decoder that decodes a received stream;

a display unit that displays a decoded stream; and a control unit that transfers information regarding channel selection to the server and switches a parameter of the decoder such that a low-rate stream or a high-rate stream transmitted from the server is decoded.

In addition, the present technology provides a communication apparatus (server) including:

a first streaming unit that encodes an input stream into a low-rate stream including user interface information;

a second streaming unit that encodes an input stream into a high-rate stream;

a wireless communication apparatus that transfers output of the first streaming unit and the second streaming unit to a terminal by way of a wireless communication network; and a control unit that, when a channel is selected at the terminal using the user interface information while the low-rate stream is being transmitted, controls such that the high-rate stream of the selected channel from the second streaming unit is transmitted to the terminal.

In addition, the present technology provides a communication apparatus (terminal) including:

a wireless communication apparatus that receives one of a low-rate stream and a high-rate stream transferred from a server by way of a wireless communication network;

a decoder that decodes the low-rate stream and the high-rate stream that have been received;

a display unit that displays a decoded stream; and a control unit that controls such that a channel selection screen is displayed on the display unit according to user interface information included in the low-rate stream, information regarding channel selection made using the channel selection screen is transferred to the server, and the high-rate stream transmitted from the server is decoded.

Effects of the Invention

According to at least one embodiment, when a user selects a viewing channel at a terminal, the user can immediately view the selected channel. Furthermore, in the case of a channel not being viewed, it is possible to reduce the streaming rate and to eliminate wasteful use of the band of wireless communication. A similar processing is carried out also in a case where a viewing terminal does not exist. Note that the effects described herein are not necessarily limited and any effects described in the present technology may be applied. In addition, effects exemplified in the following description are not interpreted to limit the content of the present technology.

MODE FOR CARRYING OUT THE INVENTION

Figure 1:
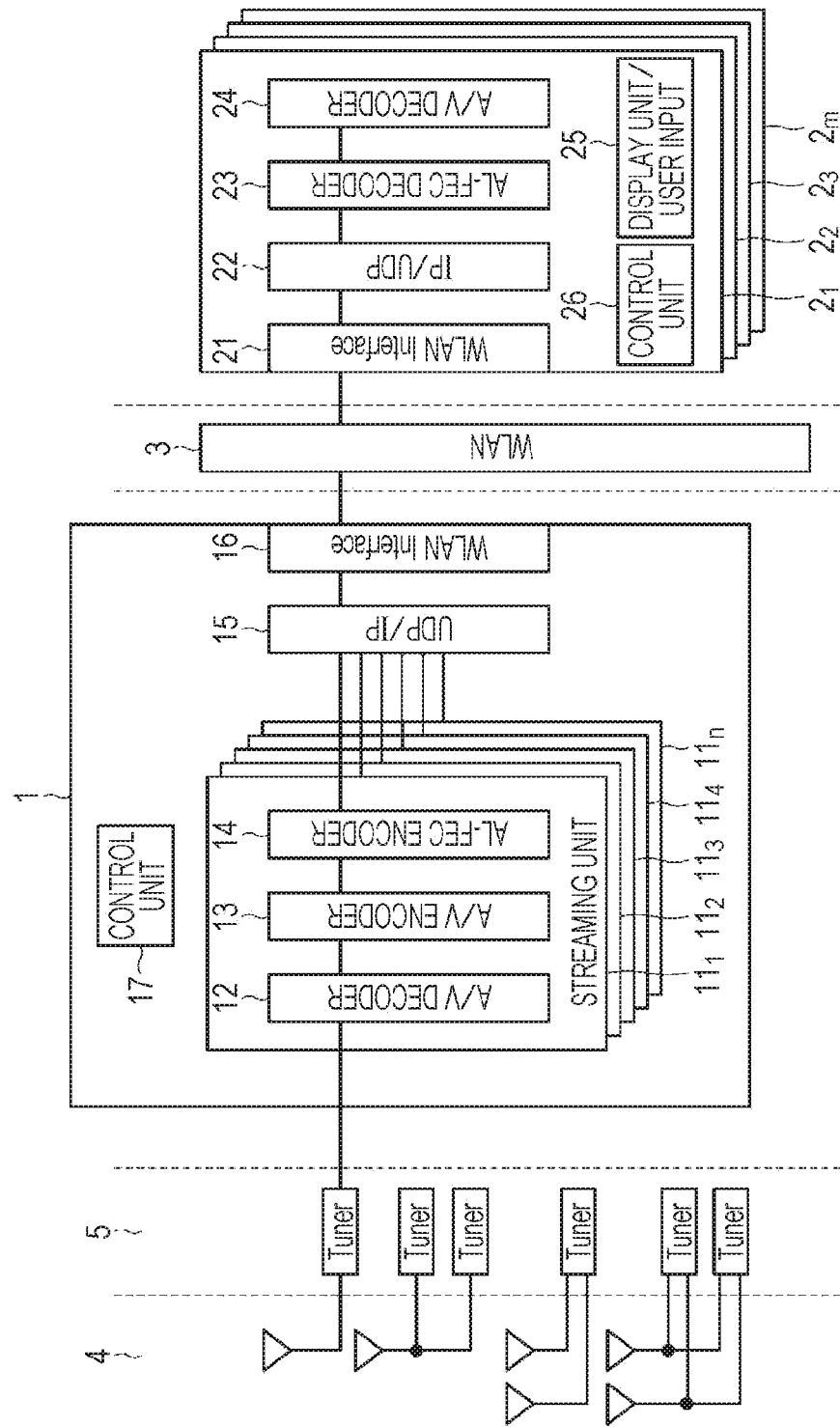
FIG. 1 is a block diagram used for explaining a system of a first embodiment.

The embodiments described below are specific favorable examples of the present technology and a variety of technologically preferable limitations are given thereto. However, in the following description, the scope of the present technology is not limited to these embodiments, unless a statement to limit the present technology is made in particular.

Note that the description of the present technology will be made in the following order.

<1. First Embodiment>
<2. Second Embodiment>
<3. Modification>
<1. First Embodiment>
"System Configuration"

A system according to a first embodiment will be described with reference to FIG. 1. The system is constituted by a streaming server (a broadcasting station, a portable base station, a wireless LAN base station, and the like) 1 that receives digital broadcasting, for example, terrestrial digital broadcasting and redistributes a broadcast program by way of a wireless communication network, terminals $2_1$, $2_2, \ldots, 2m$ which are a plurality of, for example, m number of communication apparatuses for wireless communication (these terminals will be simply referred to as terminals 2 in a case where it is not particularly necessary to distinguish the terminals), and a wireless communication network (denoted as WLAN in the drawings) 3.

An antenna unit 4 and a tuner unit 5 are connected to the streaming server 1. As configuration examples of the antenna unit 4 and the tuner unit 5, FIG. 1 illustrates a configuration constituted by a single antenna and a single tuner, a configuration constituted by a single antenna and a multi-tuner, a configuration constituted by a diversity antenna and a single tuner, and a configuration constituted by a diversity antenna and a multi-tuner. Any of these configurations can be used.

Each tuner of the tuner unit 5 receives a television broadcast signal, carries out tuning, and performs digital demodulation processing. The following standards of digital broadcasting can be applied.

DVB-T/DVB-T2/DVB-H/DVB-C/DVB-C2/ISDB-T/DVB-S/DVB-S2/ATSC-MH/ATSC-3.0

DTMB

In the case of receiving a plurality of channels (denoted as CH in the drawings as appropriate) of television broadcasting at the same time, a plurality of (n) tuners are used. The output of each tuner of the tuner unit 5 is supplied to n streaming units $11_1, 11_2, 11_3, \ldots, 11_n$ (these streaming units are simply referred to as streaming units 11 in a case where it is not particularly necessary to distinguish the streaming units) of the streaming server 1.

The streaming unit 11 has an A/V decoder 12 to which the output of the tuner unit 5 is supplied, an A/V encoder 13 to which the output of the A/V decoder 12 is supplied, and an AL-FEC encoder 14 to which the output of the A/V encoder 13 is supplied. The A/V decoder 12 performs A/V decoding processing for stream data. The A/V decoder 12 decodes data to which the following standards are applied.

H.264/H.265/HEVC/MPEG-4 AVC/MPEG-2/

The A/V encoder 13 performs processing to lower, for example, the rate of data of the digital television broadcasting to a rate that can be transmitted by the wireless communication network and generates compressed stream data. The A/V encoder 13 can generate data according to the following standards.

H.264/H.265/HEVC/MPEG-4 AVC/MPEG-2/

The AL-FEC encoder 14 performs coding processing for the stream data using application layer-forward error correction (AL-FEC).

The output of the streaming unit 11 is supplied to a user datagram protocol (UDP)/Internet protocol (IP) 15. The UDP/IP 15 performs standard protocol processing for a transport layer (UDP) and a network layer (IP).

Output data from the UDP/IP 15 is supplied to a wireless LAN interface 16. The wireless LAN interface 16 is a wireless communication transfer/reception unit. The wireless LAN interface 16 is combined with the wireless communication network 3 to perform bidirectional wireless communication. Wireless LANs in line with the following standards can be used as the wireless communication network 3.

IEEE.802.11a/11b/11g/11n/11ac/11ad

A control unit 17 is provided to control each member of the streaming server 1 (the tuner unit 5, the streaming unit 11, the UDP/IP unit 15, the wireless LAN interface 16, and the like). The control unit 17 is constituted by a central processing unit (CPU), a random access memory (RAM), a read only memory (ROM), and the like and the processing of the streaming server 1 described later is carried out under the control of the CPU.

The above-described streaming server 1 multicasts or broadcasts multiplexed broadcast data equivalent to a plurality of channels, for example, five channels. The terminal 2 receives an information packet of the broadcast data. The terminal 2 processes a packet related to a channel selected from the received data such that a program of the desired channel is viewed.

As illustrated in FIG. 1, the terminal 2 has a wireless LAN interface 21 and performs bidirectional wireless communication with the streaming server 1 via the wireless communication network 3. A UDP/IP 22 is connected to the wireless LAN interface 21 and an AL-FEC decoder 23 is connected to the UDP/IP 22. Furthermore, an A/V decoder 24 is connected to the AL-FEC decoder 23.

The wireless LAN interface 21, the UDP/IP 22, the AL-FEC decoder 23, and the A/V decoder 24 are provided corresponding to the components of the streaming unit 11 of the streaming server 1, namely, the wireless LAN interface 16, the UDP/IP 15, the AL-FEC encoder 14, and the A/V encoder 13. Additionally, a display unit/user input unit 25 is provided to reproduce decoded video and audio and input channel selection of a user, or the like.

A control unit 26 is provided to control each member of the terminal 2 (the wireless LAN interface 21, the UDP/IP 22, the AL-FEC decoder 23, the A/V decoder 24, and the like). The control unit 26 is constituted by a CPU, a RAM, a ROM, and the like and the processing of the terminal 2 described later is carried out under the control of the CPU.

"Processing Flow of Existing System"

Figure 2:
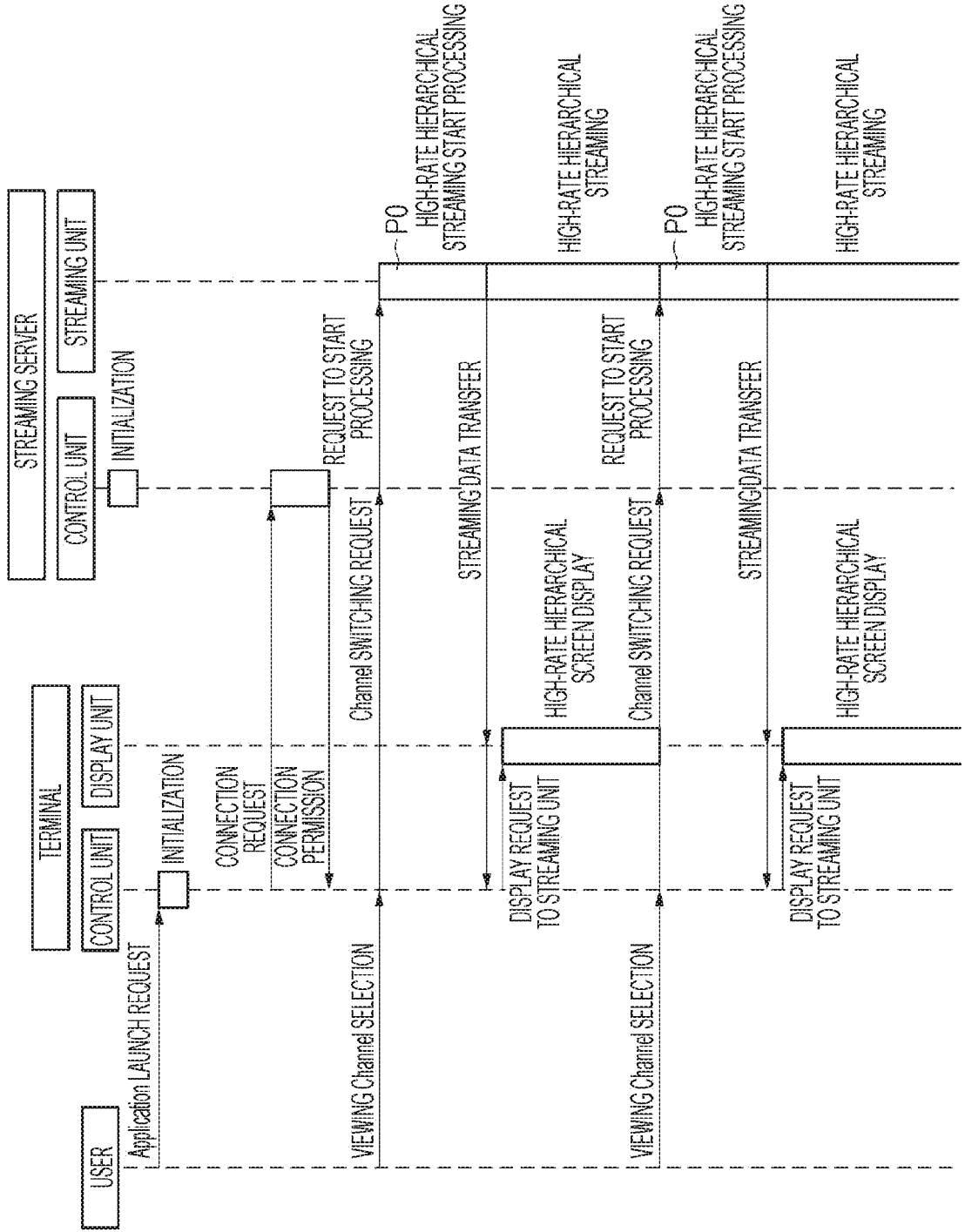
FIG. 2 is a sequence diagram for explaining processing of an existing system.
Figure 3:
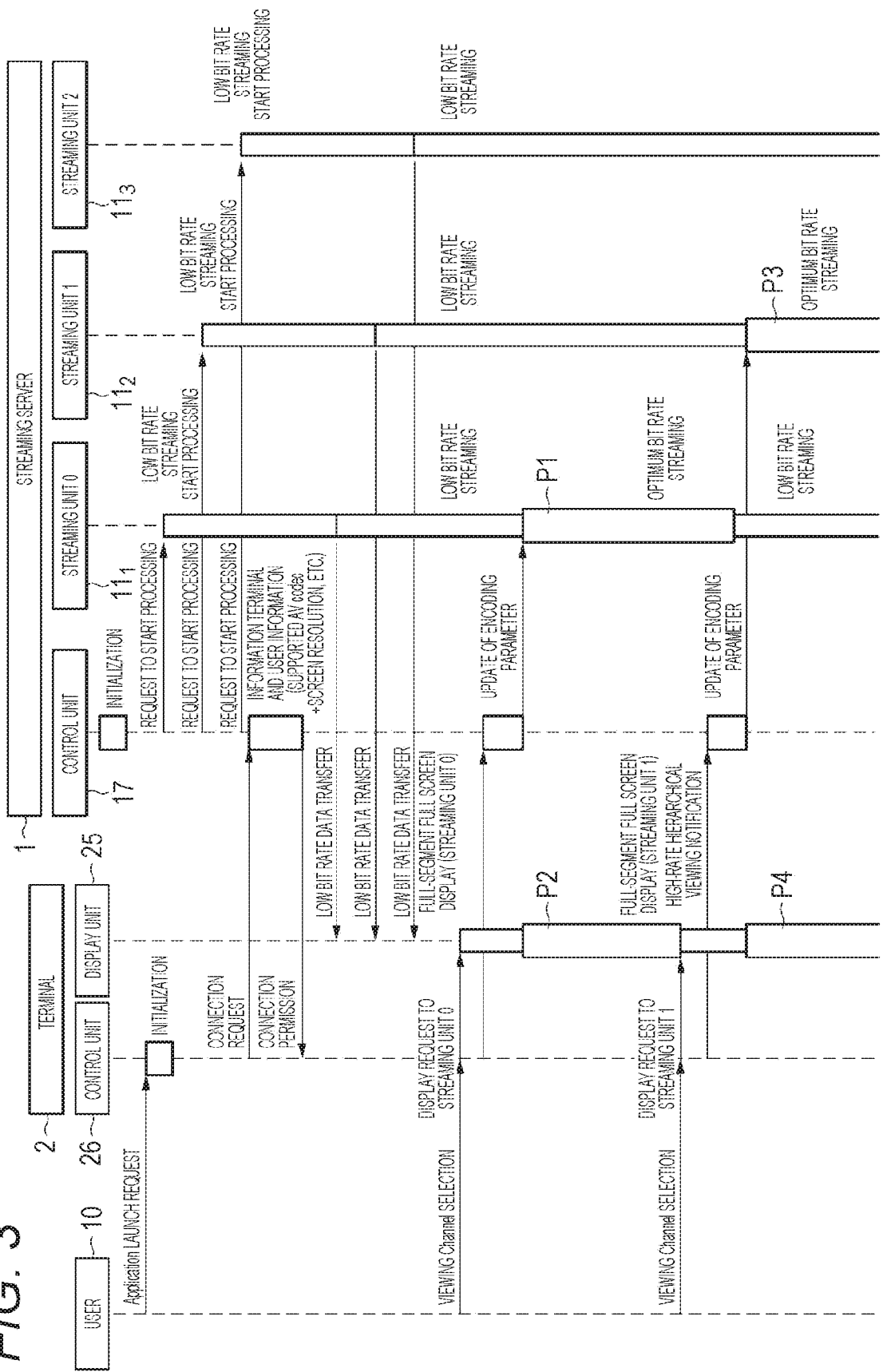
FIG. 3 is a sequence diagram for explaining processing of the first embodiment.

For ease of understanding of the present technology, the processing flow of an existing system is illustrated in FIG. 2 and the processing flow of the first embodiment is illustrated in FIG. 3. In the existing processing, when a user requests an application launch, a control unit of a terminal performs initialization. When a control unit of a streaming server that has finished initialization accepts a connection request from the terminal, the control unit issues a connection permission.

The user selects a viewing channel and transfers a channel switching request to the control unit of the streaming server. The streaming server outputs a request to start the processing to a streaming unit and the streaming unit performs streaming start processing for the high-rate hierarchy. Thereafter, streaming data is transferred to the terminal.

The terminal requests a display to the streaming unit and a high-rate hierarchical screen is displayed on a display unit. Thereafter, when the user selects the viewing channel, a similar movement to that described above is repeated.

As illustrated in FIG. 2, in the existing processing, high-rate image streaming start processing (indicated by P0) is required in the streaming server from the time the user performs the channel selection operation until the image of the applicable channel is displayed. That is, since there is processing necessary for starting broadcast reception, starting transcoding, and buffering for streaming, a waiting time is required until the video display is started after the user selects the viewing channel. The present technology can solve such an issue.

"Processing Flow of First Embodiment"

In FIG. 3 illustrating the processing flow of the first embodiment, respective sequences of a user 10, the control unit 26 and the display unit 25 of the terminal 2, and the streaming unit 11 and the control unit 17 of the streaming server 1 are illustrated. As an example, three streaming units $11_1$, $11_2$, and $11_3$ are included.

When the user 10 requests an application launch, the control unit 26 of the terminal 2 performs initialization. Upon initialization, the control unit 17 of the streaming server 1 requests a processing start to each streaming unit. Each streaming unit performs low bit rate streaming start processing.

Upon receiving a connection request from the terminal 2, the control unit 17 of the streaming server 1 transfers a connection permission to the terminal 2. The connection request includes terminal information for identifying the terminal and user information (a supported A/V codec, screen resolution, and the like).

Each of the streaming units $11_1$, $11_2$, and $11_3$ of the streaming server 1 performs the streaming start processing for the low bit rate and transfers the resultant data to the terminal 2. When the user 10 selects a channel for which the streaming unit $11_1$ is responsible as the viewing channel, a display of that channel is requested to the display unit 26. Since low bit rate streaming has already been started, the video display can be started instantly after the request. Concurrently, the control unit 17 of the streaming server 1 is notified of a viewing stream.

In the streaming server 1, the streaming unit $11_1$ is instructed to update an encoding parameter. In response to this instruction, the streaming unit $11_1$ performs processing for optimum bit rate streaming (indicated by P1). Accordingly, a full screen display of a stream at a bit rate suitable for the terminal is presented on the display unit 25 of the terminal 2 (indicated by P2).

Furthermore, when the user 10 selects a channel for which the streaming unit $11_2$ is responsible as the viewing channel, a display of that channel is requested to the display unit 26. Concurrently, the control unit 17 of the streaming server 1 is notified of the viewing stream.

In the streaming server 1, the streaming unit $11_2$ is instructed to update the encoding parameter. In response to this instruction, the streaming unit $11_2$ performs processing for optimum bit rate streaming (indicated by P3). Accordingly, a full screen display of a stream at a bit rate suitable for the terminal is presented on the display unit 25 of the terminal 2 (indicated by P4). Note that, when the streaming unit $11_2$ is instructed to update the encoding parameter, the encoding parameter of the streaming unit $11_1$ is changed to one for performing the processing for low bit rate streaming.

The first embodiment includes the plurality of streaming units 11 and all channels are always streamed by multicast at the same time. Accordingly, when the selection operation of the user for the viewing channel is notified, the processing of tuning, transcoding, and the FEC is not required in the tuner and, as a result, the video display of the selected channel can be started immediately after the user selects the viewing channel.

During a transition from the image of a previous channel until the image of a new channel is displayed in a case where the channel is selected, the low bit rate image of the new channel can be displayed and thus it is possible to prevent the image from being interrupted.

Since the encoding parameter of the streaming server is switched from the low rate bit setting to the optimum encoding parameter according to the channel selection request, the band can be efficiently used and high image quality viewing complying with reception conditions is achieved.

"Processing of Existing System"

Figure 4:
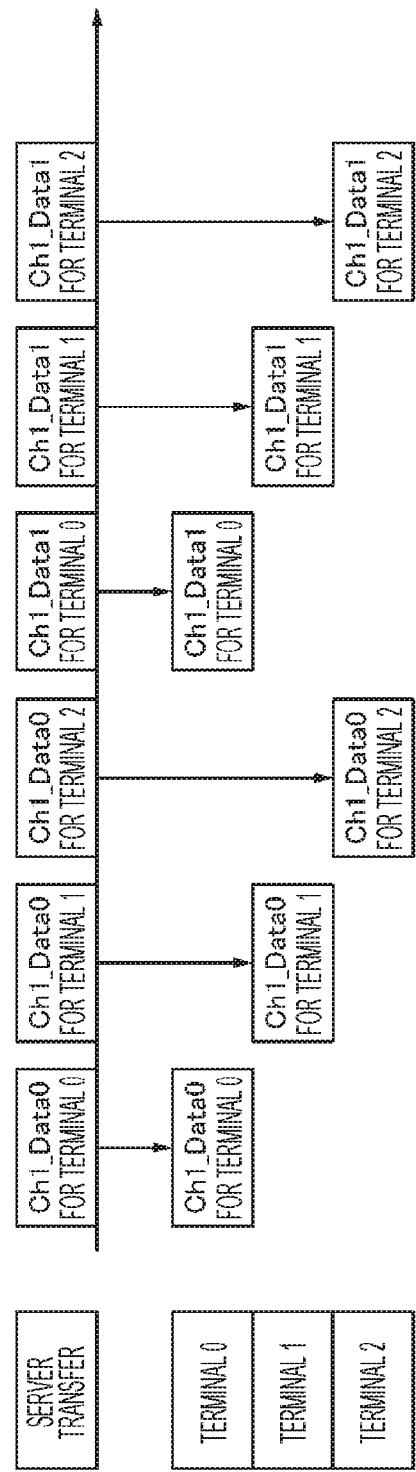
FIG. 4 is a schematic diagram for explaining processing of an existing system.

Next, transmission efficiency at the time of wireless LAN streaming will be described. FIG. 4 is a time series diagram of transfer from the server side to the terminals. Ch_Data is transferred from the server in units of packets. In the case of using unicast of the existing system, as illustrated in FIG. 4, an individual packet for the terminal for each viewer is required for viewing the television broadcasting. Accordingly, when plural terminals 0, 1 and 2 are used to view the same channel Ch1, it is necessary to transfer the same channel data for three terminals. In this manner, the transmission efficiency is reduced in the existing system.

"Processing According to First Embodiment"

Figure 5:
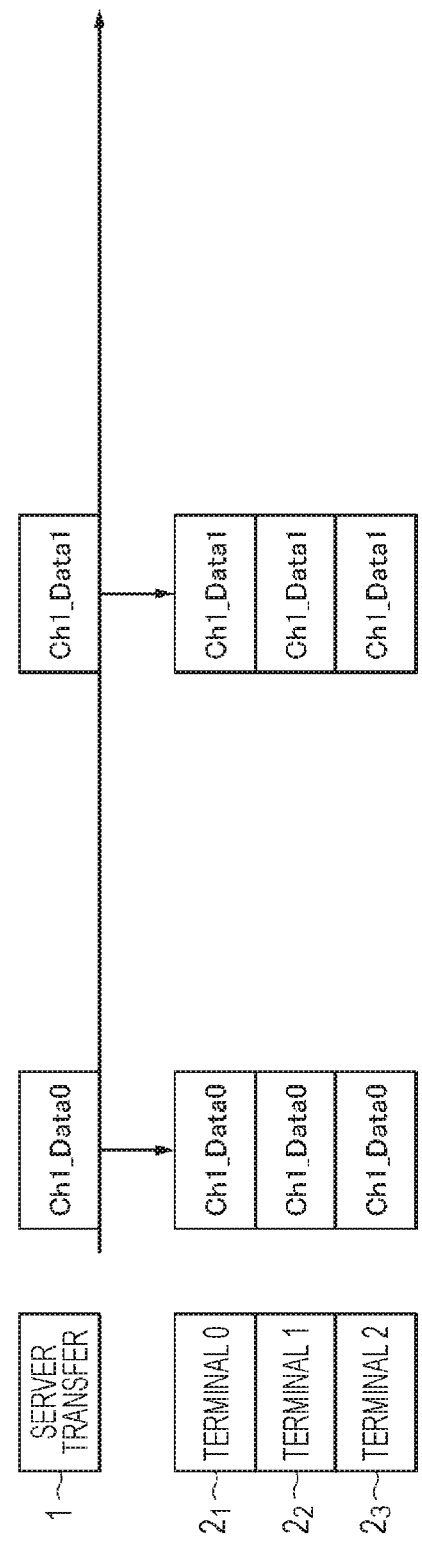
FIG. 5 is a schematic diagram for explaining processing of the present technology.

According to the present technology, since three terminals $2_1$, $2_2$, and $2_3$ jointly use a transfer packet in response to the viewing requests for the same channel using multicast transmission as illustrated in FIG. 5, the streaming server 1 is only required to transfer the packet at one time and thus the transmission efficiency can be improved. Furthermore, since the streaming server 101 recognizes the number of terminals being connected and the addresses of the terminals, the rate of a stream is lowered while no terminal is connected.

"Processing of Streaming Server"

Figure 6:
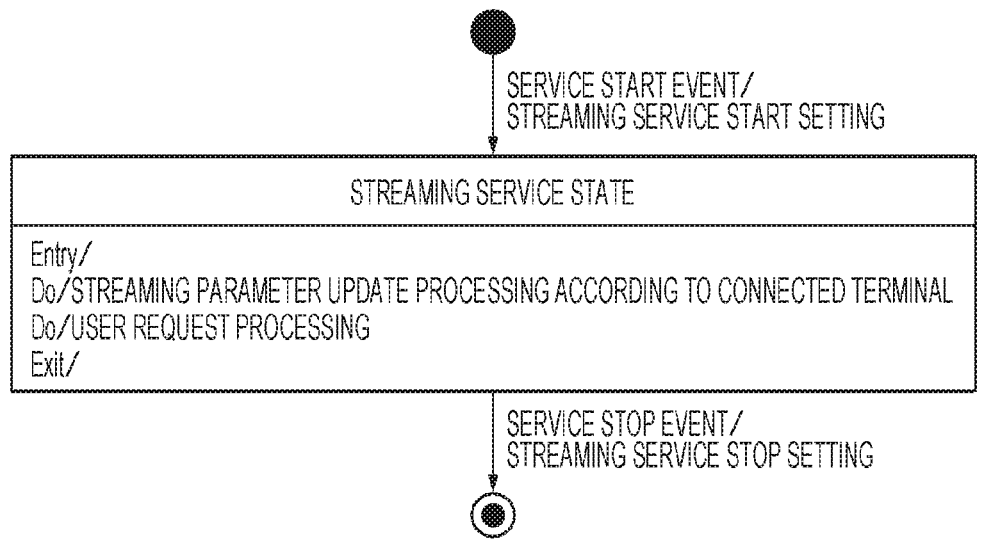
FIG. 6 is a state transition diagram of a streaming server.

The processing of the streaming server 1 of the first embodiment will be described. FIG. 6 is a state transition diagram of the streaming server 1. A unified modeling language (UML) is used as a language for explanation, which will be similarly applied to the description later. In the UML, a solid circle indicates the start of the state diagram, whereas a double solid circle indicates the end of the state diagram. In the state (block) in FIG. 6, the name section contains "streaming service state".

In an internal transition section, an action is stated using syntax (action label/action).

The action labels reserved in the UML include Entry, Exit, Do, Include.

Entry: Indicates an action to be executed at the entry of a state

Exit: Indicates an action to be executed at the exit of a state

Do: Indicate an action to be executed in a state

Include: Indicates calling a state machine refining a state

The action label indicates an event that activates an action stated on the right of /. Since such an event refers to transition within a state, the event is semantically identical to transition to its own state, except for the entry and the exit of the state.

"Streaming service state" starts with "service start event/streaming service start setting" and ends with "service stop event/streaming service stop setting". The internal transition section is as follows.

Entry/

Do/Streaming parameter update processing according to a connected terminal

Do/User request processing

Exit/

Figure 7:
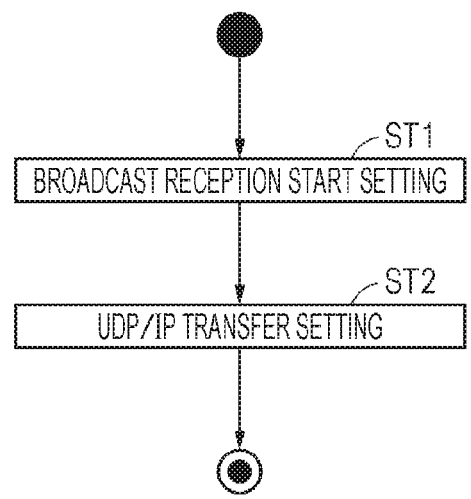
FIG. 7 is a flowchart illustrating processing for a streaming service start setting.

The movement of the streaming server 1 will be described. FIG. 7 illustrates the actions of the streaming service start setting. That is, step ST1 (broadcast reception start setting) and step ST2 (UDP/IP transfer setting) are carried out. In step ST2, a multicast address is set as a transfer destination and multicast transmission is performed for the terminal.

Figure 8:
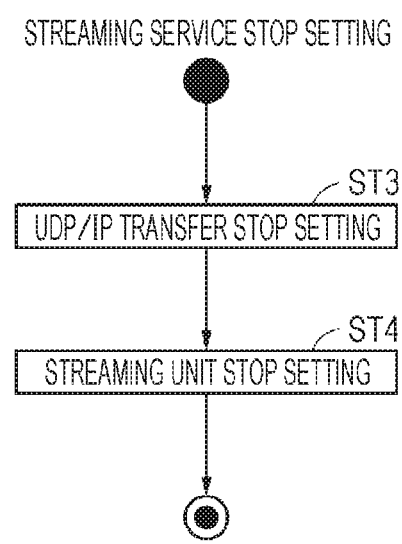
FIG. 8 is a flowchart illustrating processing for a streaming service stop setting.

FIG. 8 illustrates the actions of the streaming service stop setting. That is, step ST3 (UDP/IP transfer stop setting) and step ST4 (streaming unit stop setting) are carried out.

Figure 9:
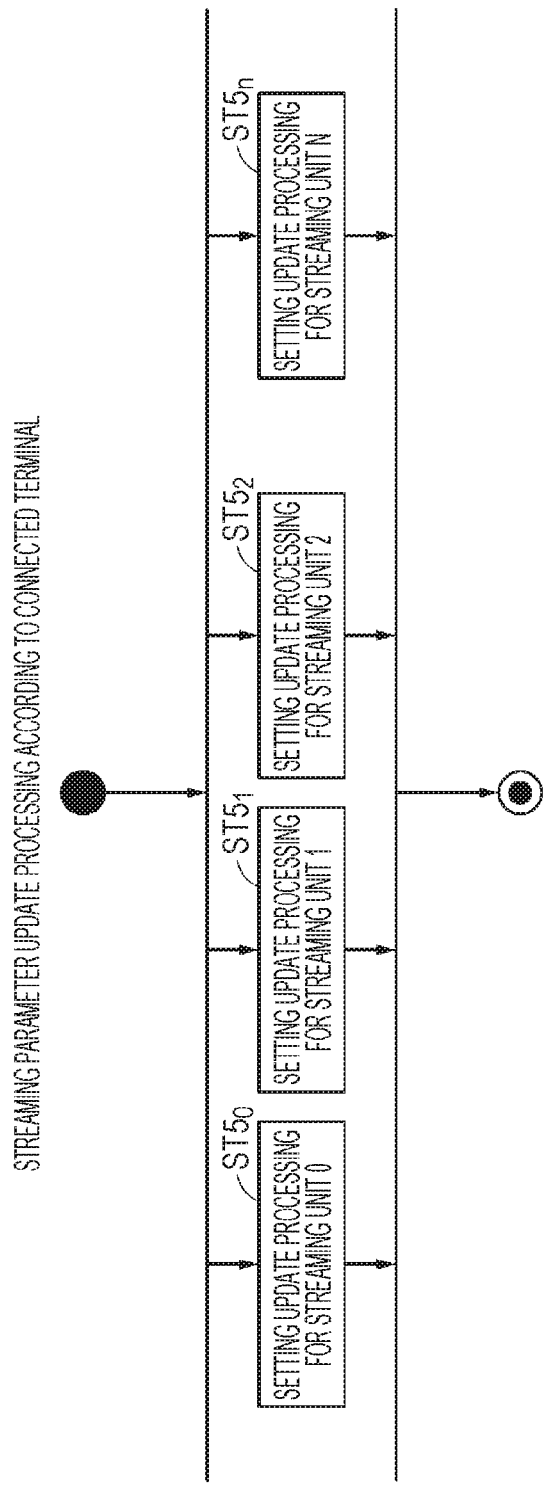
FIG. 9 is a flowchart illustrating processing for a streaming parameter update.

FIG. 9 illustrates the actions of the streaming parameter update processing according to a connected terminal. That is, step $ST5_0$ (setting update processing for a streaming unit 0 (the streaming unit $11_1$ in FIG. 1)), step $ST5_1$ (setting update processing for a streaming unit 1 (the streaming unit $11_2$ in FIG. 1)), step $ST5_2$ (setting update processing for a streaming unit 2 (the streaming unit $11_3$ in FIG. 1)), . . . , step $ST5_N$ (setting update processing for a streaming unit N) are carried out.

Figure 10:
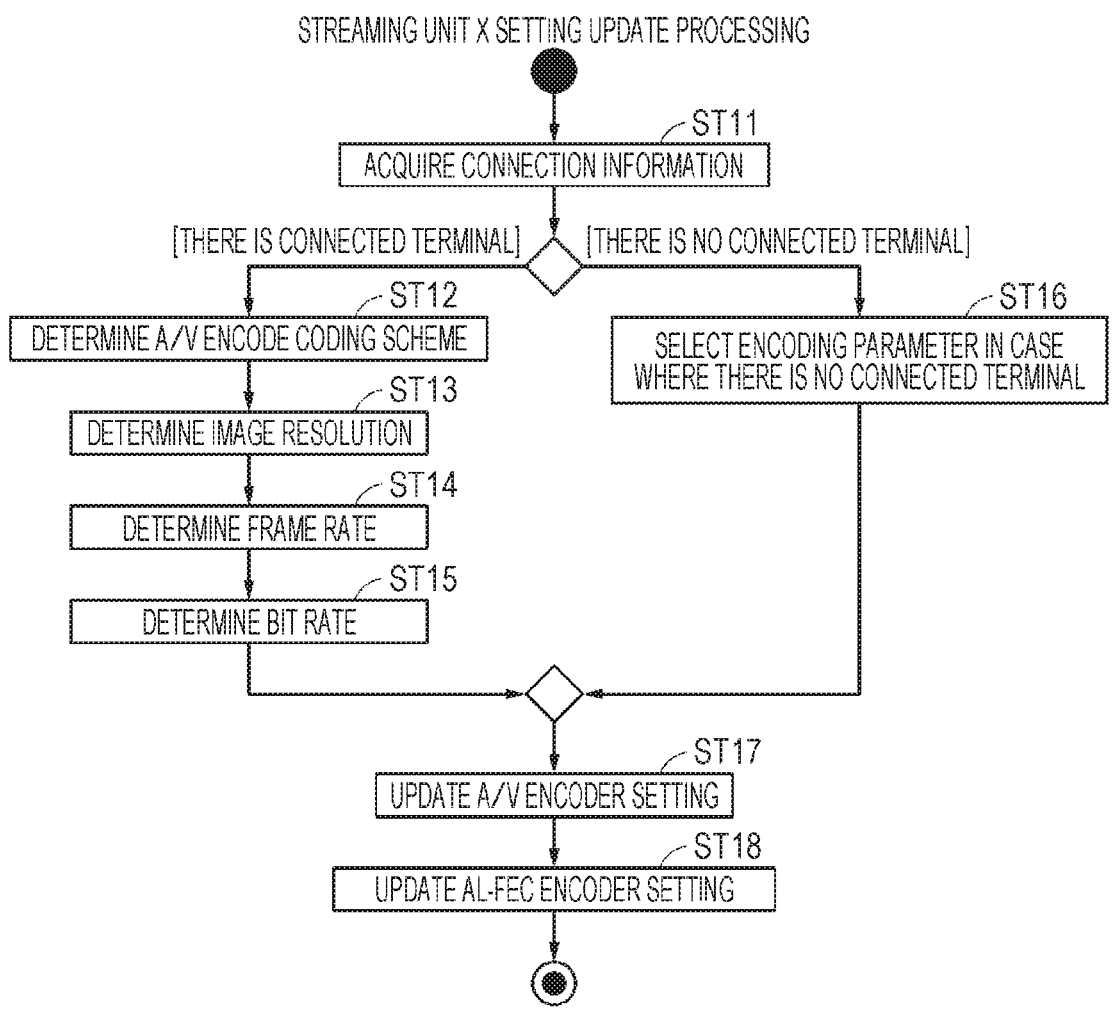
FIG. 10 is a flowchart illustrating processing for a streaming unit setting update.

FIG. 10 is a flowchart illustrating the actions of the setting update processing for the streaming unit. Rhombic marks in the flowchart represent branching processing.

Step ST11: Connection information is acquired. The user information, the terminal information, and viewing stream information are stored in the connection information.

In a case where there is a connected terminal, the following processing is carried out.
 Step ST12: Determination of A/V encode coding scheme
 Step ST13: Determination of image resolution
 Step ST14: Determination of frame rate
 Step ST15: Determination of bit rate The encoding parameters of a profile level supported by the most terminals are selected from among profile levels supported by the connected terminals and encoding is performed according to the selected parameters. As a result, as many terminals as possible are allowed to receive the service. It is possible to hinder an increase in the amount of calculation and use of a band caused by selecting an unnecessarily high level.

In a case where there is no connected terminal, processing in step ST16 is carried out.

Step ST16: An encoding parameter in a case where there is no connected terminal is selected.

That is, even in a case where there is no connected terminal, encoding is performed at the lowest level. Band saving can be achieved and the delay at the time of selecting the viewing channel can be excluded.
 Step ST17: The setting of the A/V encoder is updated.
 Step ST18: The setting of the AL-FEC encoder is updated.

Figure 11:
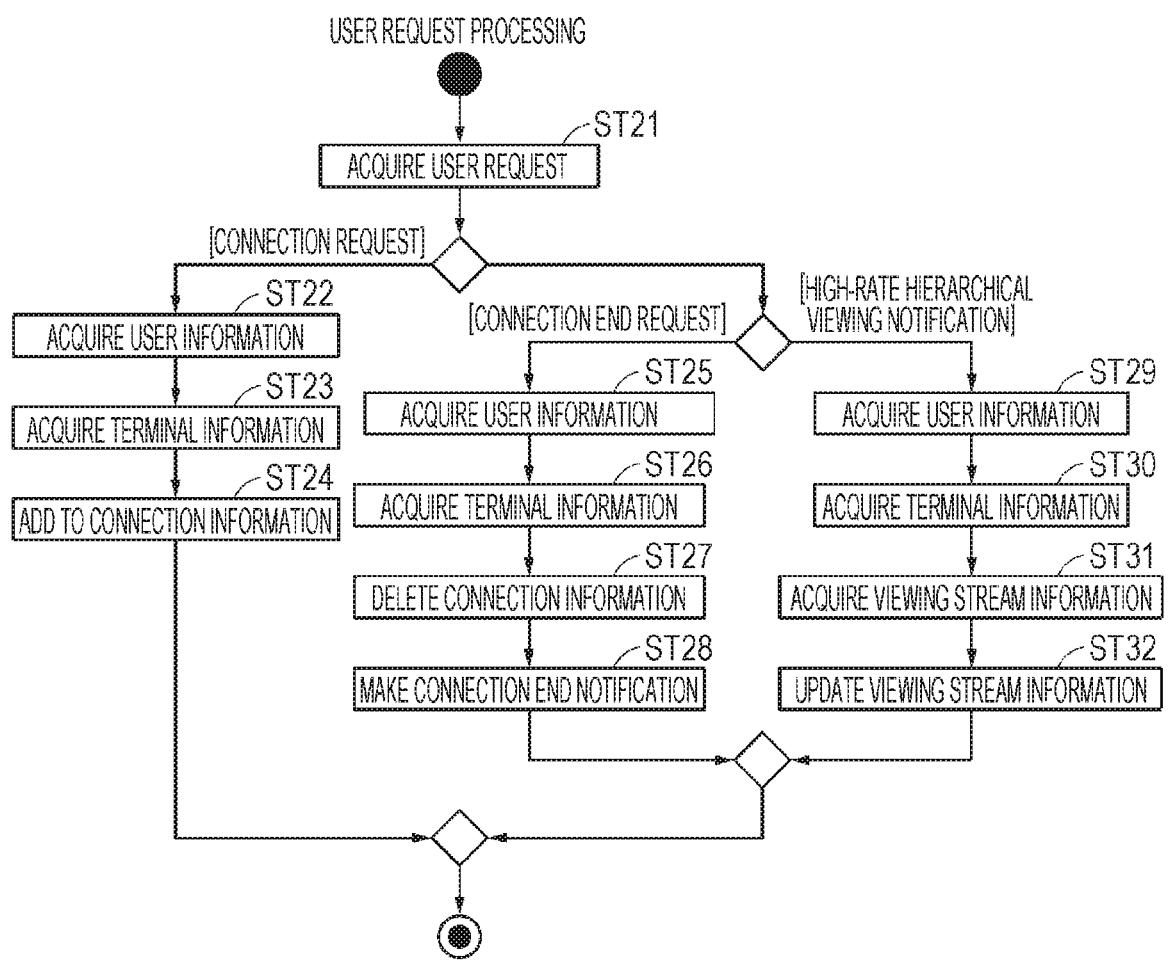
FIG. 11 is a flowchart illustrating processing for a streaming service.

FIG. 11 is a flowchart illustrating the actions of the user request processing of the streaming server 1.

Step ST21: A user request is acquired. In a case where the user request is a connection request, the following processing is carried out.
 Step ST22: The user information is acquired.
 Step ST23: The terminal information is acquired.
 Step ST24: Addition to the connection information is made and end processing is carried out. That is, the user information, the terminal information, and connection stream information are stored in the connection information.

In a case where the user request is a connection end request, the following processing is carried out.
 Step ST25: The user information is acquired.
 Step ST26: The terminal information is acquired.
 Step ST27: The connection information is deleted.
 Step ST28: A connection end notification is made and the end processing is carried out.

In a case where the user request is a high-rate hierarchical viewing notification, the following processing is carried out.

Step ST29: The user information is acquired.
Step ST30: The terminal information is acquired.
Step ST31: The viewing stream information is acquired.
Step ST28: The viewing stream information is updated and the end processing is carried out.

Table 1 illustrates an example of the connection information. Information regarding each terminal obtained at the time of the connection request and from the high-rate hierarchical viewing notification is saved.

TABLE 1

Connection information

| User information | Viewing stream information | A/V codec coding scheme | Profile | Level | Screen resolution |
| --- | --- | --- | --- | --- | --- |
| User 0 | Stream 0 | H.265 | BP | 4.1 | 4K class |
| User 1 | Stream 1 | H.264 | BP/MP | 4.1 | HD (720) class |
| User 2 | Stream 2 | H.264 | BP/MP/XP | 4.1 | FHD class |
| User 3 | Stream 1 | H.264 | BP/MP | 4.1 | FHD class |

Describing the selection of the encoding parameter in the case of high-rate hierarchical streaming, since encoding and streaming at a relatively low level defined in advance are carried out even in a case where there is no connected terminal, it becomes possible to reproduce a desired channel without delay in a case where a channel to view is selected by the terminal, while the use of a band for streaming is minimized. Table 2 illustrates an example of the encoding parameters in a case where there is no connected terminal.

TABLE 2

| | Coding scheme | Profile | Level | Screen resolution | Frame rate | Bit rate |
| --- | --- | --- | --- | --- | --- | --- |
| There is no connected terminal | H.264 | BP | 4.1 | HD (720 p) | 30 fps | 3 Mbps |

Table 3 illustrates an example of the encoding parameters in a case where there are three connected terminals.

TABLE 3

When there is connected terminal (Example 1)

| | Coding scheme | Profile | Level | Screen resolution |
| --- | --- | --- | --- | --- |
| Terminal A | H.264 | BP | 4.1 | HD (720) class |
| Terminal B | H.265 | Main | 5 | 4K class |
| Terminal C | H.265 | Main | 5 | 4K class |

The encoding parameters of a profile level supported by the most terminals are selected from among profile levels supported by the connected terminals and encoding is performed. Encoding is performed at the lowest level even if there is no connected terminal. In the example in table 3, encoding is performed with encoding parameters of the profile level of the connected terminal B or the connected terminal C (table 4), which is supported by the most terminals among the connected terminals.

TABLE 4

|  | Coding scheme | Profile | Level | Screen resolution | Frame rate | Bit rate |
|---|---|---|---|---|---|---|
| There is connected terminal | H.265 | Main | 5 | 4K | 60 fps | 30 Mbps |

Table 5 illustrates another example of encoding parameters in a case where there are three connected terminals.

TABLE 5

When there is connected terminal (Example 2)

|  | Coding scheme | Profile | Level | Screen resolution |
|---|---|---|---|---|
| Terminal A | H.265 | Main | 5 | Full HD (FHD) class |
| Terminal B | H.265 | Main | 5 | 4K class |
| Terminal C | H.265 | Main | 6 | 8K class |

The encoding parameters of a profile level at the lowest level are selected from among profile levels supported by the connected terminals and encoding is performed. Encoding is performed at the lowest level even if there is no connected terminal. In the example in table 5, encoding is performed with encoding parameters of the profile level of the connected terminal A (table 6), having the lowest level.

TABLE 6

|  | Coding scheme | Profile | Level | Screen resolution | Frame rate | Bit rate |
|---|---|---|---|---|---|---|
| There is connected terminal | H.265 | Main | 5 | FHD (full HD) | 30 fps | 8 Mbps |

As a reference for selecting the encoding parameter, the above two examples indicate an example of selecting the encoding parameter supported by the most terminals and an example of selecting the encoding parameter at the lowest level. By setting the encoding parameters in this manner, as many terminals as possible are allowed to receive the service. It is possible to avoid selection of unnecessarily high level, as well as the amount of unnecessary calculation and unnecessary use of a band.

"Processing of Terminal"

Figure 12:
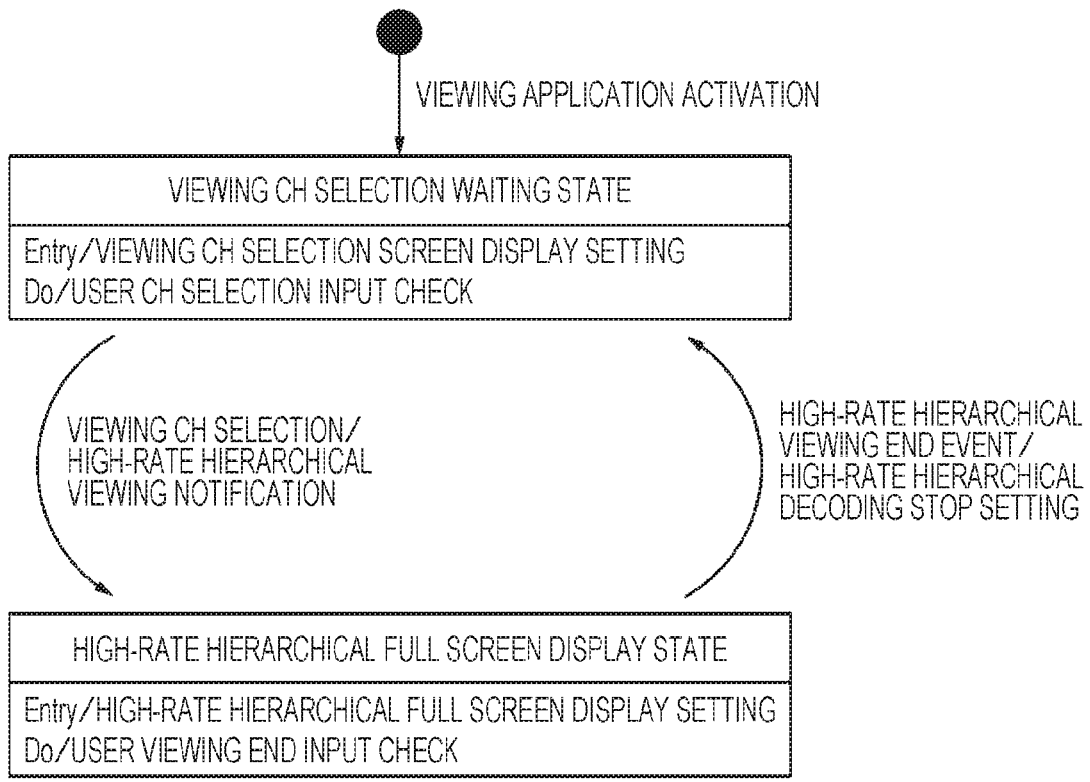
FIG. 12 is a state transition diagram of a terminal.

The processing of the terminal 2 of the first embodiment will be described. FIG. 12 is a viewing state transition diagram of the terminal 2. The state (block) in FIG. 12 has two states, namely, a state where the name section contains "viewing channel selection waiting state" and a state where the name section contains "high-rate hierarchical full screen display state".

"Viewing channel selection waiting state" starts with "viewing application activation" and the internal transition section is as follows.

Entry/Viewing channel selection screen display setting
Do/User channel selection input check The action of a high-rate hierarchical reception request is activated by an event of viewing channel selection and "viewing channel selection waiting state" transits to "high-rate hierarchical full screen display state". The action of a high-rate hierarchical decoding stop setting is activated by the event of a high-rate hierarchical viewing end and "high-rate hierarchical full screen display state" transits to "viewing channel selection waiting state".

The internal transition section of "high-rate hierarchical full screen display state" is as follows.

Figure 13:
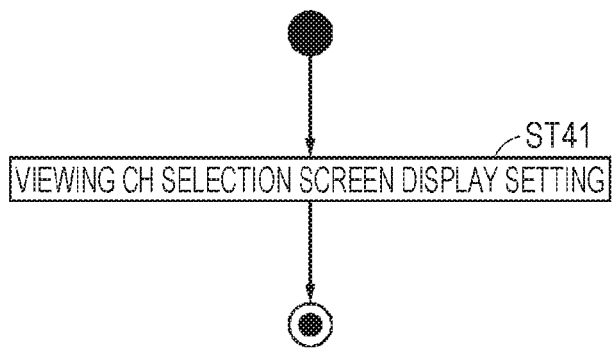
FIG. 13 is a flowchart illustrating processing for a viewing channel selection screen display setting.

Entry/High-rate hierarchical full screen display state
Do/User viewing end input check As illustrated in FIG. 13, the viewing channel selection screen display setting is executed in step ST41.

Figure 14:
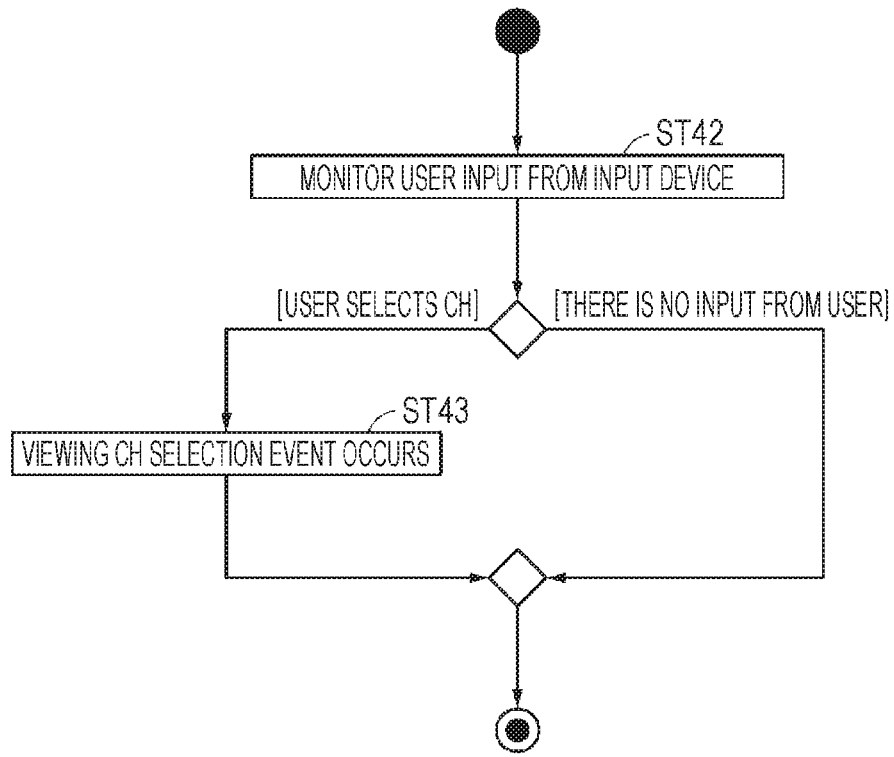
FIG. 14 is a flowchart illustrating processing for a user channel selection input check.

The user channel selection input check is executed as illustrated in a flowchart in FIG. 14.

Step ST42: User input from an input device is monitored. In a case where there is no user input, the processing ends.

Step ST43: When the user selects the viewing channel, a viewing channel selection event occurs.

Figure 15:
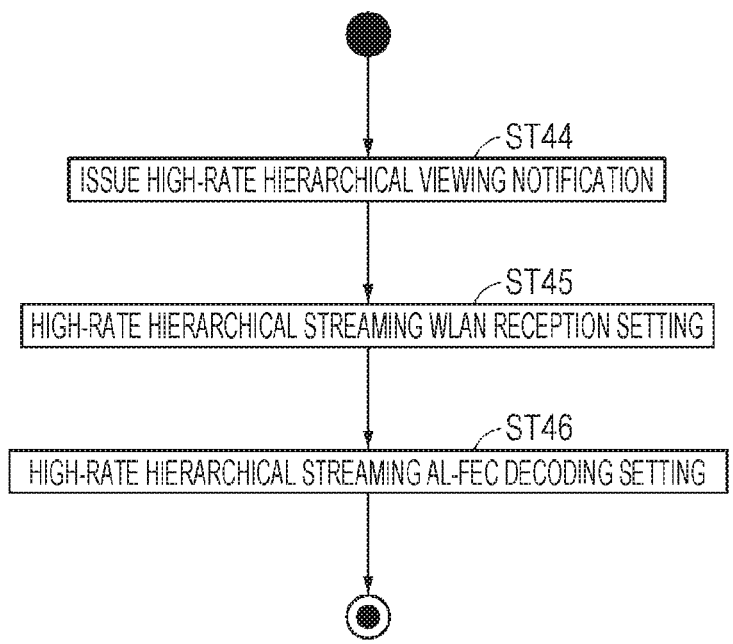
FIG. 15 is a flowchart illustrating processing for a high-rate hierarchical reception request.

When the viewing channel selection event occurs, the high-rate hierarchical viewing notification illustrated in FIG. 15 is made. At the time of the high-rate hierarchical viewing notification, the user information and the terminal information are notified at the same time.

Step ST44: Issuance of the high-rate hierarchical viewing notification

Step ST45: High-rate hierarchical streaming wireless LAN reception setting

Step ST46: High-rate hierarchical streaming AL-FEC decoding setting

Figure 16:
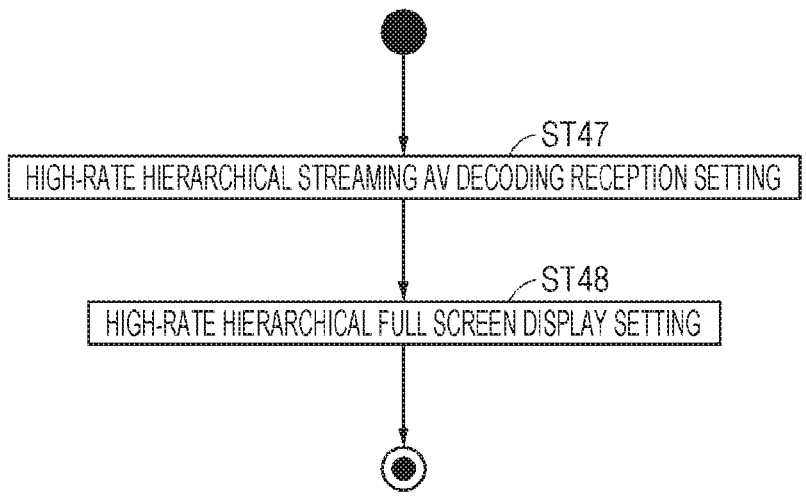
FIG. 16 is a flowchart illustrating processing for a high-rate hierarchical full screen display setting.

A high-rate hierarchical full screen display setting is illustrated in FIG. 16.

Step ST47: High-rate hierarchical streaming A/V decoding reception setting

Step ST48: High-rate hierarchical full screen display setting

Figure 17:
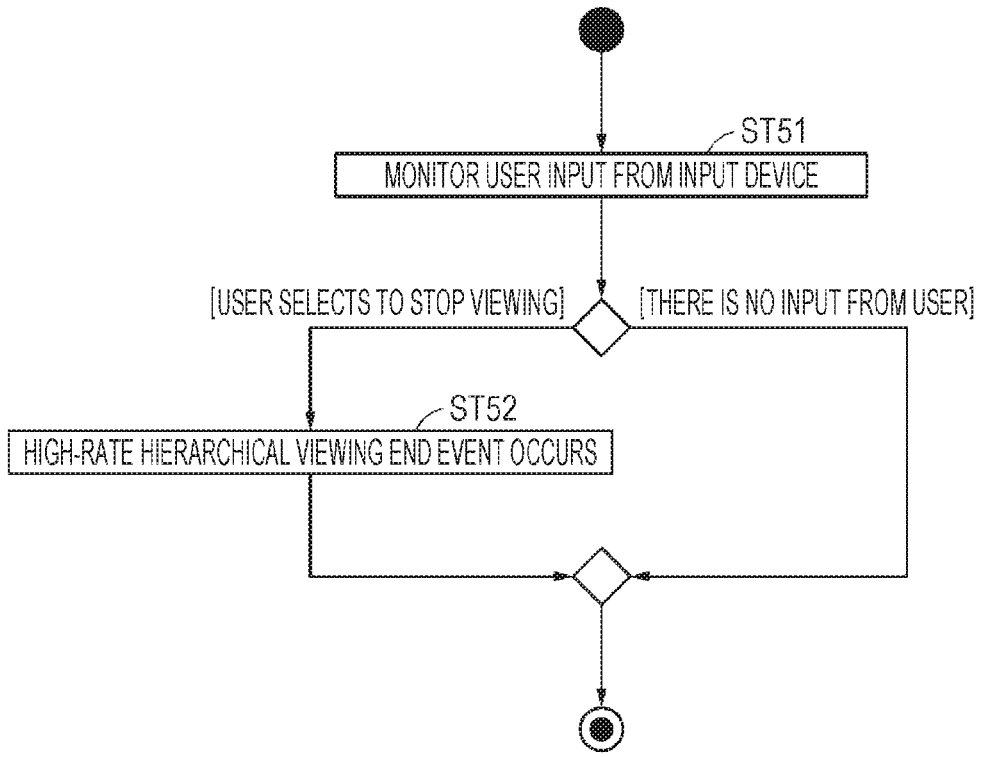
FIG. 17 is a flowchart illustrating processing for a user viewing end input check.

The user viewing end input check is illustrated in FIG. 17.

Step ST51: User input from an input device is monitored. In a case where there is no input from the user, the processing ends.

Step ST52: When the user selects to stop viewing, a high-rate hierarchical viewing end event occurs.

Figure 18:
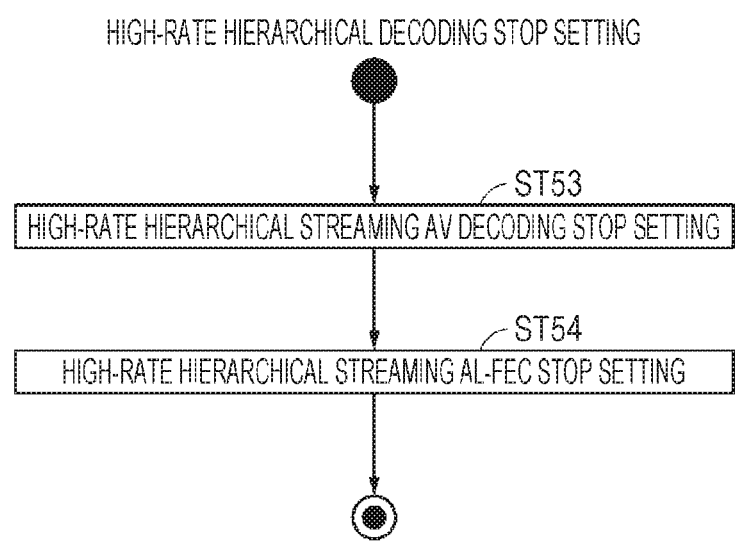
FIG. 18 is a flowchart illustrating processing for a high-rate hierarchical decoding stop setting.

A high-rate hierarchical decoding stop setting is made as illustrated in FIG. 18.

Step ST53: High-rate hierarchical streaming A/V decoding stop setting

Step ST54: High-rate hierarchical streaming AL-FEC stop setting

<2. Second Embodiment>

"System Configuration"

Figure 19:
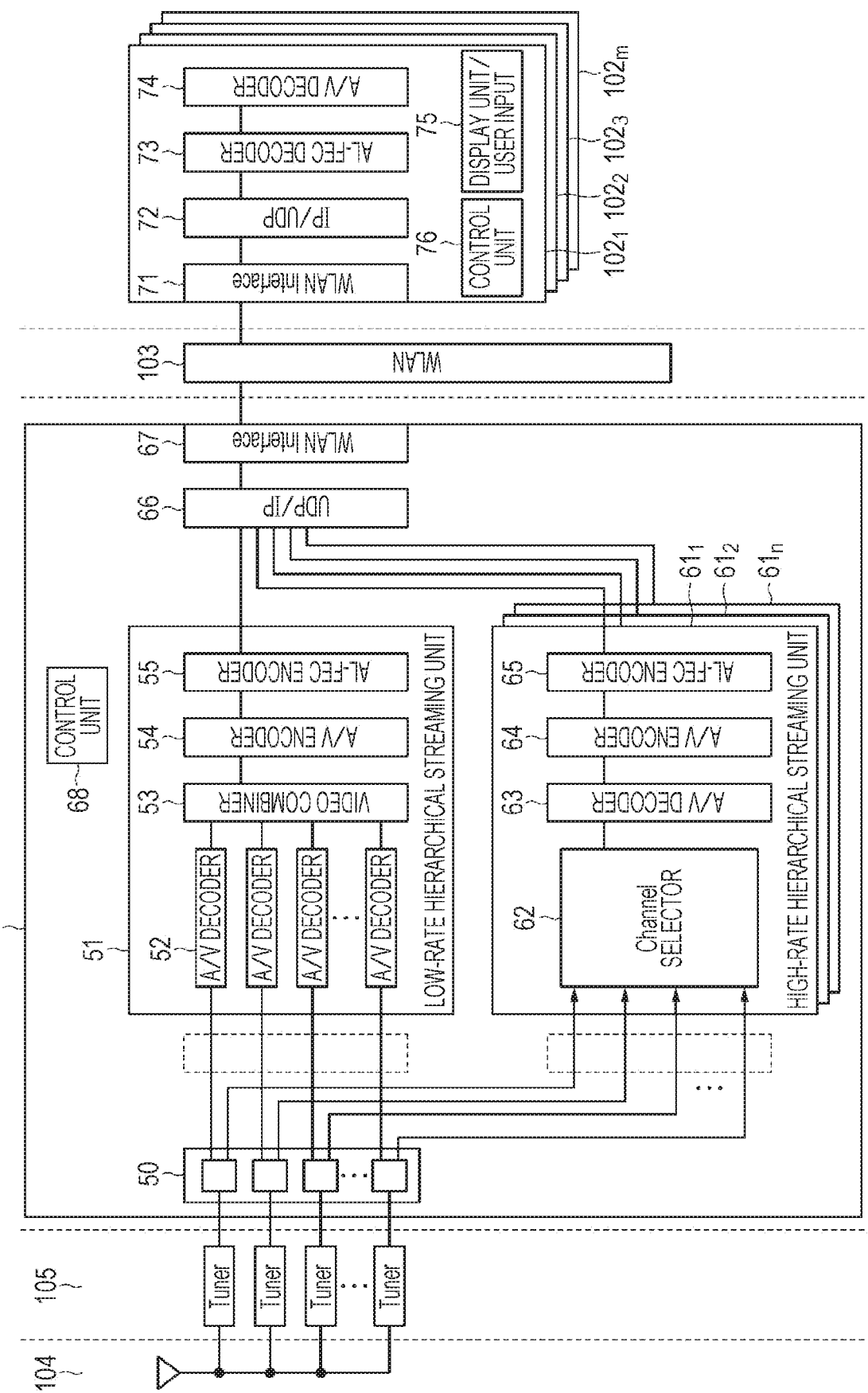
FIG. 19 is a block diagram used for explaining a system of a second embodiment.

A system according to a second embodiment will be described with reference to FIG. 19. The system is constituted by a streaming server (a portable base station, a wireless LAN base station, and the like) 101 that receives digital broadcasting, for example, terrestrial digital broadcasting, terminals $102_1, 102_2, 102_3, \ldots, 102_m$ which are a plurality of, for example, four communication apparatuses for wireless communication (these terminals will be simply referred to as terminals 102 in a case where it is not particularly necessary to distinguish the terminals), and a wireless communication network 103.

An antenna unit 104 and a tuner unit 105 are connected to the streaming server 101. For example, a configuration in which n tuners are connected in parallel to the antenna unit 104 is used. The configuration allows to receive n channels of television broadcasting at the same time. Note that a diversity reception scheme may be used.

Each tuner of the tuner unit 105 receives a television broadcast signal, carries out tuning, and performs digital demodulation processing. The following standards of digital broadcasting can be applied. In the second embodiment, the same content is transferred at a plurality of rates (the low-rate hierarchy and the high-rate hierarchy) in the broadcast channels of the television broadcasting. In the ISDB-T, the low-rate hierarchical broadcasting is one-segment broadcasting and the high-rate hierarchical broadcasting is full-segment broadcasting. The following standards of digital broadcasting are applied to the television broadcasting.

DVB-T/DVB-T2/DVB-H/DVB-C/DVB-C2/ISDB-T/DVB-S/DVB-S2/ATSC-MH/ATSC-3.0

DTMB

The output of each tuner of the tuner unit 105 is supplied to a hierarchical data separation unit 50. The hierarchical data separation unit 50 separates the low-rate hierarchical data and the high-rate hierarchical data. The separated low-rate hierarchical data is supplied to an A/V decoder unit 52 of a low-rate hierarchical streaming unit 51. The A/V decoder unit 52 has n A/V decoders each supplied with the low-rate hierarchical data. The A/V decoder unit 52 performs A/V decoding processing for stream data. The A/V decoder unit 52 can decode data to which the following standards are applied.

H.264/H.265/HEVC/MPEG-4 AVC/MPEG-2

The output of the A/V decoder unit 52 is supplied to a video combiner 53 and one merged stream (multi-screen moving image) is created. Output data from the video combiner 53 is supplied to an A/V encoder 54. The A/V encoder 54 performs processing to lower, for example, the rate of data of the digital television broadcasting to a rate that can be transmitted by the wireless communication network and generates compressed stream data. The output of the A/V encoder 54 is supplied to an AL-FEC encoder 55. The A/V encoder 54 can generate data to which the following standards are applied.

H.264/H.265/HEVC/MPEG-4 AVC/MPEG-2

The AL-FEC encoder 55 performs coding processing for the stream data using AL-FEC.

The output of the streaming unit 51 is supplied to a UDP/IP 66. The UDP/IP 66 performs standard protocol processing for the transport layer (UDP) and the network layer (IP).

Output data from the UDP/IP 66 is supplied to a wireless LAN interface 67. The wireless LAN interface 67 is a wireless communication transfer/reception unit. The wireless LAN interface 67 is combined with the wireless communication network 103 to perform bidirectional wireless communication. Wireless LANs in line with the following standards can be used.

IEEE.802.11a/11b/11g/11n/11ac/11ad n pieces of the high-rate hierarchical data separated by the hierarchical data separation unit 50 are supplied to respective high-rate hierarchical streaming units $61_1$ to $61_n$. The high-rate hierarchical streaming units $61_1$ to $61_n$ (these high-rate hierarchical streaming units are simply referred to as high-rate hierarchical streaming units 61 in a case where it is not particularly necessary to distinguish the high-rate hierarchical streaming units) have the same configuration.

The high-rate hierarchical streaming unit 61 has a channel selector 62, an A/V decoder 63, an A/V encoder 64, and an AL-FEC encoder 65. The channel selector 62 selects stream data requested by the user to output to the A/V decoder 63.

The A/V decoder 63 performs A/V decoding processing for the stream data. The A/V decoder 63 can decode data to which the following standards are applied.

H.264/H.265/HEVC/MPEG-4 AVC/MPEG-2

The A/V encoder 64 can generate data to which the following standards are applied.

H.264/H.265/HEVC/MPEG-4 AVC/MPEG-2

The AL-FEC encoder 65 performs coding processing for the stream data using AL-FEC.

The output of the n high-rate hierarchical streaming units 61 is supplied to the UDP/IP 66 and output data from the UDP/IP 66 is supplied to the wireless LAN interface 67. The wireless LAN interface 67 is combined with the wireless communication network 103 to perform bidirectional wireless communication. Wireless LANs in line with the following standards can be used as the wireless communication network 103.

IEEE.802.11a/11b/11g/11n/11ac/11ad

A control unit 68 is provided to control each member of the streaming server 101 (the tuner unit 105, the low-rate hierarchical streaming unit 51, the high-rate hierarchical streaming unit 61, the UDP/IP unit 66, the wireless LAN interface 67, and the like). The control unit 68 is constituted by a CPU, a RAM, a ROM, and the like and the processing of the streaming server 101 described later is carried out under the control of the CPU.

The above-described streaming server 101 streams the broadcast data. The low-rate hierarchy is multicast or broadcast, whereas the high-rate hierarchy is transferred by unicast. The terminal 102 processes a packet related to a channel selected from the received data such that a program of the desired channel is viewed.

The terminal 102 has a configuration similar to that of the terminal 2 of the above-described first embodiment. That is, the terminal 102 has a wireless LAN interface 71 and performs bidirectional wireless communication via the wireless communication network 103. A UDP/IP 72 is connected to the wireless LAN interface 71 and an AL-FEC decoder 73 is connected to the UDP/IP 72. Furthermore, an A/V decoder 74 is connected to the AL-FEC decoder 73. Additionally, a display unit/user input unit 75 is provided to reproduce decoded video and audio and input channel selection of a user, or the like.

A control unit 76 is provided to control each member of the terminal 102 (the wireless LAN interface 71, the UDP/IP 72, the AL-FEC decoder 73, the A/V decoder 74, and the like). The control unit 76 is constituted by a CPU, a RAM, a ROM, and the like and the processing of the terminal 102 described later is carried out under the control of the CPU.

"Processing Flow of Second Embodiment"

Figure 20:
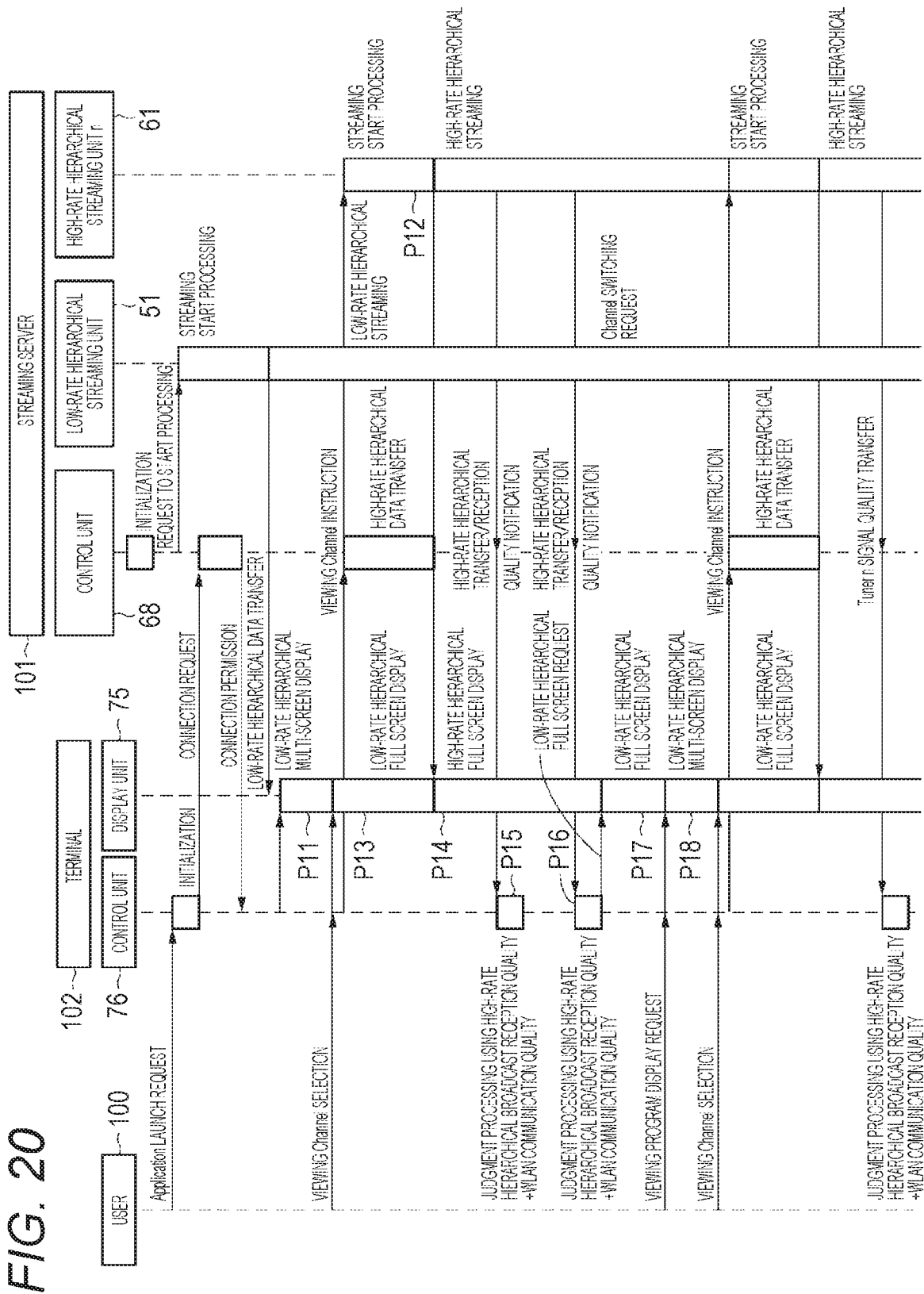
FIG. 20 is a sequence diagram for explaining processing of the second embodiment.

FIG. 20 illustrates the flow of processing of the second embodiment. In FIG. 20, respective sequences of a user 100, the control unit 76 and the display unit (display unit/user input) 75 of the terminal 102, and the control unit 68, the low-rate hierarchical streaming unit 51, and the high-rate hierarchical streaming unit 61 of the streaming server 101 are illustrated.

When the user 100 requests an application launch, the control unit 76 of the terminal 102 performs initialization. Upon initialization, the control unit 68 of the streaming server 101 requests a processing start to the low-rate hierarchical streaming unit 51. The low-rate hierarchical streaming unit 51 performs low bit rate streaming start processing. Then, low-rate hierarchical streaming is carried out.

Upon receiving the connection request from the terminal 102, the control unit 68 of the streaming server 101 transfers a connection permission to the terminal 102. The connection request includes the terminal information for identifying the terminal and the user information (a supported A/V codec, screen resolution, and the like).

When the terminal 102 requests a connection and the connection is permitted, the reception of the low-rate hierarchical data and data coding are started and a low-rate hierarchical multi-screen display P11 is presented on the display unit 75 of the terminal 102. The low-rate hierarchical multi-screen display is a user interface screen that divides one screen into n divided screens and displays programs of n channels on the respective screens at the same time. The user 100 selects a channel that the user wants to view while watching the low-rate hierarchical multi-screen display.

In this manner, when the viewing channel is instructed from the terminal 102, the control unit 68 of the streaming server 101 performs high-rate hierarchical data transfer processing and the high-rate hierarchical streaming unit 61 corresponding to the instructed channel performs streaming start processing P12. Thereafter, the high-rate hierarchical streaming data is transferred to the terminal. A high-rate hierarchical full screen display P14 is presented with the high-rate hierarchical streaming data.

During the streaming start processing P12, the high-rate hierarchical full screen display cannot be presented. However, in the terminal 102, a low-rate hierarchical full screen display P13 is immediately presented when the channel is selected on the multi-screen display and thereafter switched to the high-rate hierarchical full screen display P14. Accordingly, it is possible to prevent the delay in which an image display is not presented.

A high-rate hierarchical transfer/reception quality notification is presented on the high-rate hierarchical full screen display P14 by the streaming server 101. The control unit 76 of the terminal 102 performs judgment processing P15 using both high-rate hierarchical broadcast reception quality and wireless LAN communication quality. That is, it is judged whether the high-rate hierarchical streaming can be continued. When it is judged that the high-rate hierarchical streaming can be continued, the high-rate hierarchical full screen display is continued. The judgment processing is performed, for example, at predetermined time intervals in the high-rate hierarchical full screen display state.

In judgment processing P16, when it is judged that the high-rate hierarchical streaming cannot be continued, the display is switched to a low-rate hierarchical full screen display P17. When the user 100 inputs a viewing program display request, the display is switched to a low-rate hierarchical multi-screen display P18. Furthermore, when the user selects the viewing channel, a similar movement to that described above is repeated.

In the second embodiment, the multi-screen of the low-rate hierarchical stream is streamed by multicast and the data thereof is shared. The low-rate hierarchical stream being received on the multi-screen of the low-rate hierarchical stream is complemented by being converted to the full screen during the streaming start processing time that occurs at the time of selecting the viewing channel. Since a stream in which the low-rate hierarchical data of all the channels is converted into the multi-screen is always streamed by multicast, the video display of the selected channel can be started immediately after the user selects the viewing channel. In the existing system, since there is time necessary for starting broadcast reception, starting transcoding, and buffering for streaming, time is required until the video display is started after the user selects the viewing channel. On the other hand, the video display of the selected channel can be started immediately after the user selects the viewing channel.

Figure 21:
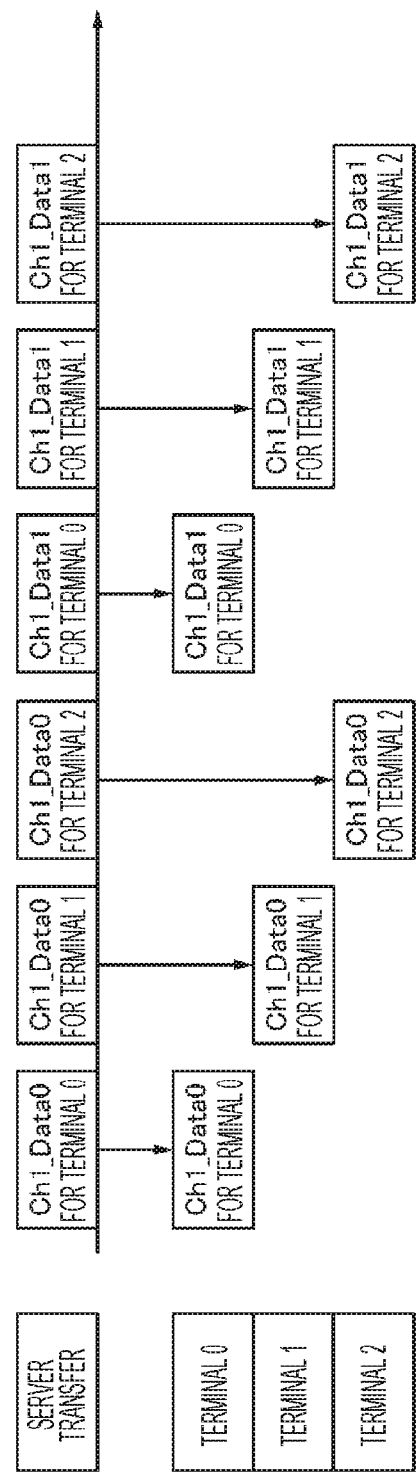
FIG. 21 is a schematic diagram for explaining processing of an existing system.

Furthermore, similarly to the first embodiment, the second embodiment can enhance the transmission efficiency at the time of wireless LAN streaming. When the television broadcasting using unicast is viewed, data for each viewer is required as illustrated in FIG. 21. Accordingly, when a plurality of terminals 0, 1 and 2 is used to view the same channel Ch1, it is necessary to transfer the same channel data for three terminals. Each terminal receives data for own terminal. In this manner, the transmission efficiency is reduced in the existing system.

FIG. 21 is a time series diagram of transfer from the server side to the terminals. Ch_Data is transferred from the server in units of packets. In the case of using the unicast of the existing system, as illustrated in FIG. 21, an individual packet for the terminal for each viewer is required for viewing the television broadcasting. Accordingly, when the plurality of terminals 0, 1 and 2 is used to view the same channel Ch1, it is necessary to transfer the same channel data for three terminals. In this manner, the transmission efficiency is reduced in the existing system.

Figure 22:
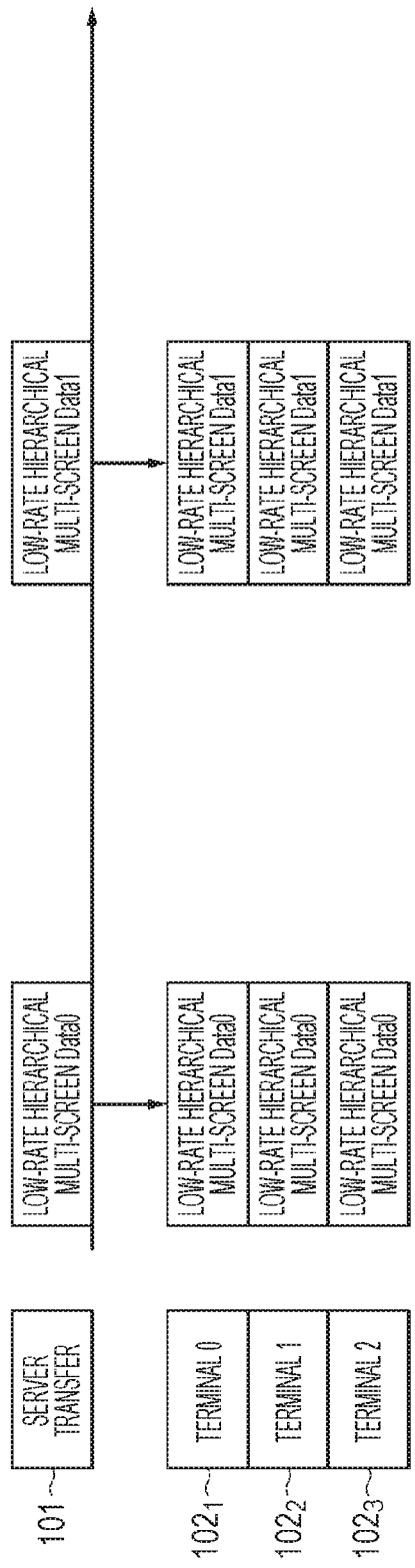
FIG. 22 is a schematic diagram for explaining processing of the present technology.

According to the second embodiment, since three terminals 102$_1$, 102$_2$, and 102$_3$ jointly use one piece of the low-rate hierarchical multi-screen data using multicast transfer as illustrated in FIG. 22, the streaming server 101 is only required to transfer data at one time and thus the transmission efficiency can be improved. Furthermore, since the streaming server 101 recognizes the number of terminals being connected and the addresses of the terminals, the rate of a stream is lowered while no terminal is connected. Additionally, when the viewing channel is selected at the terminal, the high-rate hierarchical stream of the selected channel is transmitted by unicast to this terminal, whereby the user can view the high-rate hierarchical broadcasting.

Furthermore, the second embodiment can deal with the reception quality reduction due to in-car broadcast reception and fluctuations in wireless communication. In the existing system, switching control between main broadcasting (high-rate hierarchical stream) and sub-broadcasting (low-rate hierarchical stream) is performed depending on the broadcast reception quality. In this case, since the wireless LAN wireless communication quality is not taken into account, the main broadcasting/sub-broadcasting cannot be properly selected. In the second embodiment, the reception quality of the main broadcasting and the sub-broadcasting is judged on the terminal side and thus the broadcast reception and the wireless LAN wireless communication reception are assessed such that the high-rate hierarchical stream and the low-rate hierarchical stream can be properly selected. Accordingly, good viewing can always be implemented.

"Processing of Streaming Server"

Figure 23:
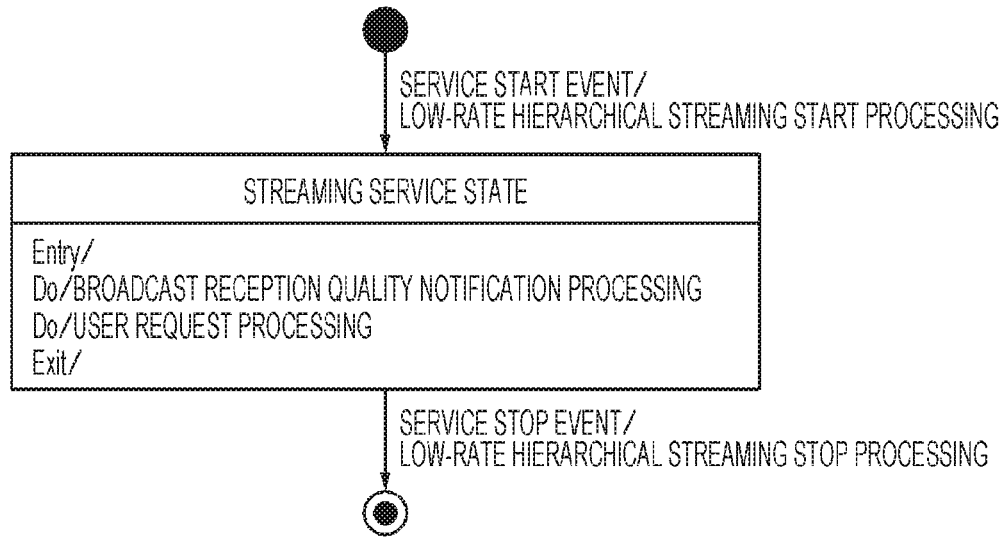
FIG. 23 is a state transition diagram of a streaming server.

The processing of the streaming server 101 of the second embodiment will be described. FIG. 23 is a state transition diagram of the streaming server 101. In the state (block) in FIG. 23, the name section contains "streaming service state".

"Streaming service state" starts with "service start event/low-rate hierarchical streaming start processing" and ends with "service stop event/streaming service stop processing". The internal transition section is as follows.

Entry/
Do/Broadcast reception quality notification processing
Do/User request processing
Exit/

Figure 24:
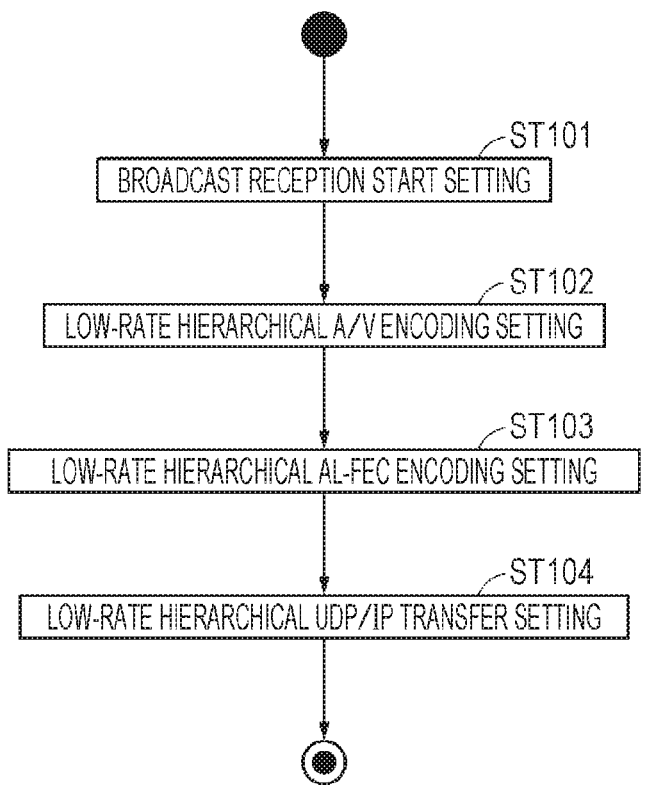
FIG. 24 is a flowchart illustrating low-rate hierarchical streaming start processing.

The movement of the streaming server 101 will be described. FIG. 24 illustrates the actions of streaming service start processing and the following items of processing are sequentially carried out.

Step ST101: Broadcast reception start setting
Step ST102: Low-rate hierarchical A/V encoder setting
Step ST103: Low-rate hierarchical AL-FEC encoding setting
Step ST104: Low-rate hierarchical UDP/IP transfer setting) is made. That is, in the low-rate hierarchical streaming, a multicast address is set as a transfer destination and multicast transmission is performed for the terminal.

Figure 25:
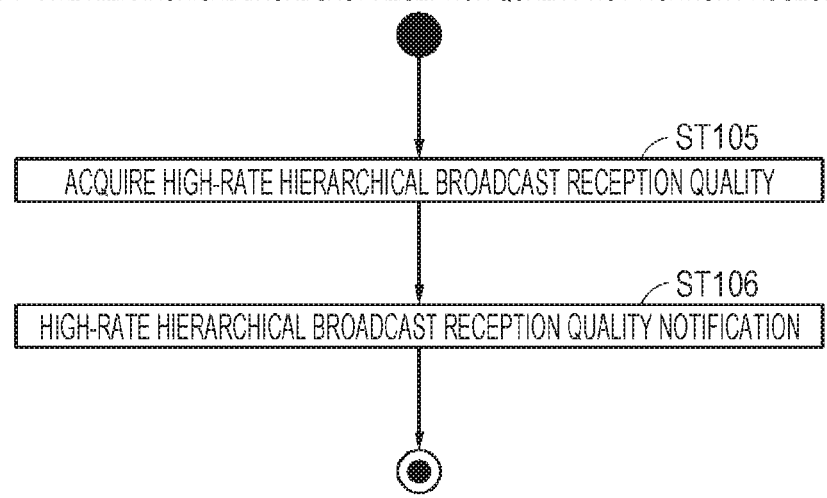
FIG. 25 is a flowchart illustrating processing for a high-rate hierarchical broadcast reception quality notification setting.

FIG. 25 illustrates the actions of high-rate hierarchical broadcast reception quality notification processing and the following items of processing are sequentially carried out.

Figure 26:
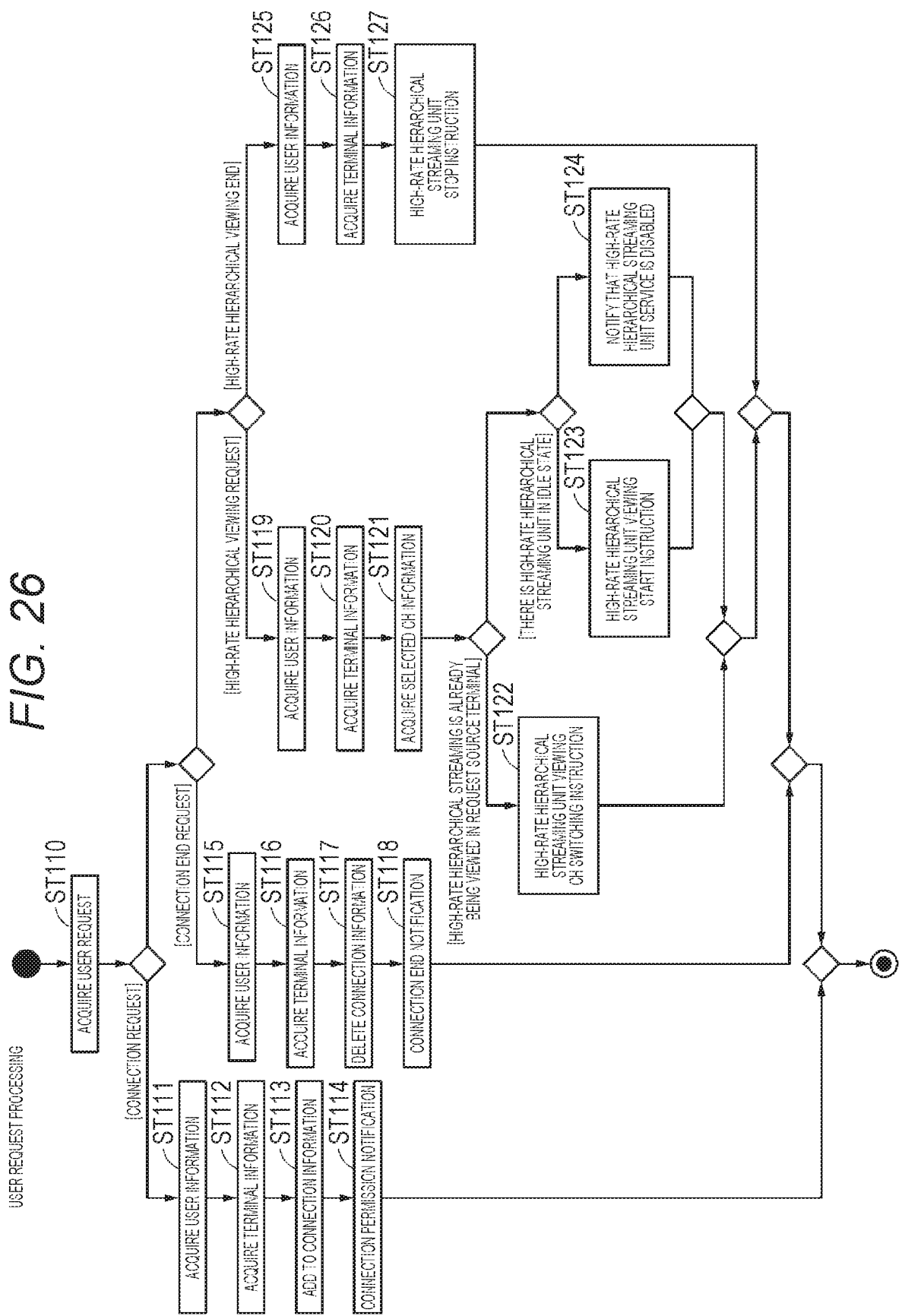
FIG. 26 is a flowchart illustrating user request processing.

Step ST105: Acquisition of the high-rate hierarchical broadcast reception quality Step ST106: High-rate hierarchical broadcast reception quality notification FIG. 26 is a flowchart illustrating the actions of user request processing of the streaming server 101.

Step ST110: A user request is acquired. In a case where the user request is a connection request, the following items of processing are sequentially carried out.

Step ST111: The user information is acquired.

Step ST112: The terminal information is acquired.

Step ST113: Addition to the connection information is made and the end processing is carried out.

Step ST114: A connection permission notification is made and the end processing is carried out.

In a case where the user request is a connection end request, the following items of processing are sequentially carried out.

Step ST115: The user information is acquired.

Step ST116: The terminal information is acquired.

Step ST117: The connection information is deleted.

Step ST118: A connection end notification is made and the end processing is carried out.

In a case where the user request is a high-rate hierarchical viewing request, the following items of processing are sequentially carried out.

Step ST119: The user information is acquired.

Step ST120: The terminal information is acquired.

Step ST121: Selected channel information is acquired.

In a case where the high-rate hierarchical streaming is already being viewed in the request source terminal, the following processing is carried out.

Step ST122: A high-rate hierarchical streaming unit viewing channel switching instruction is made.

In a case where the high-rate hierarchical streaming has not already been viewed in the request source terminal and there is a high-rate hierarchical streaming unit in an idle state, the following processing is carried out.

Step ST123: A high-rate hierarchical streaming unit viewing start instruction is made.

In a case where the high-rate hierarchical streaming has not already been viewed in the request source terminal and there is no high-rate hierarchical streaming unit in the idle state, the following processing is carried out.

Step ST124: A high-rate hierarchical streaming unit service disabled notification is made.

In a case where the user request is a high-rate hierarchical viewing end, the following items of processing are sequentially carried out.

Step ST125: The user information is acquired.

Step ST126: The terminal information is acquired.

Step ST127: A high-rate hierarchical streaming unit stop instruction is made and the processing ends.

Figure 27:
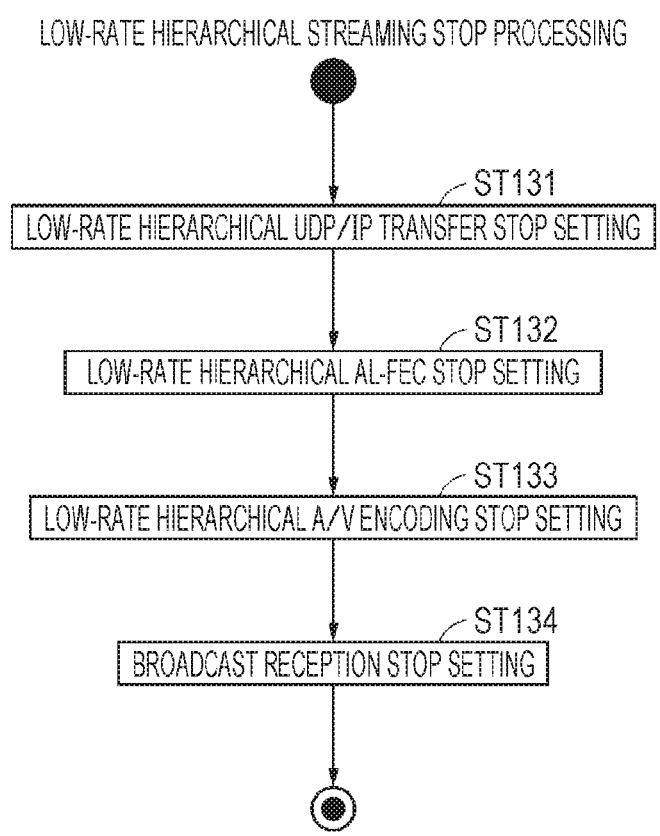
FIG. 27 is a flowchart illustrating low-rate hierarchical streaming stop processing.

FIG. 27 illustrates the actions of a low-rate hierarchical streaming service stop setting. The following items of processing are sequentially carried out.

Step ST131: Low-rate hierarchical UDP/IP transfer stop setting

Step ST132: Low-rate hierarchical AL-FEC stop setting

Step ST133: Low-rate hierarchical A/V encoding stop setting

Step ST134: Broadcast reception stop setting

"State Transition of High-Rate Hierarchical Streaming Unit of Streaming Server"

Figure 28:
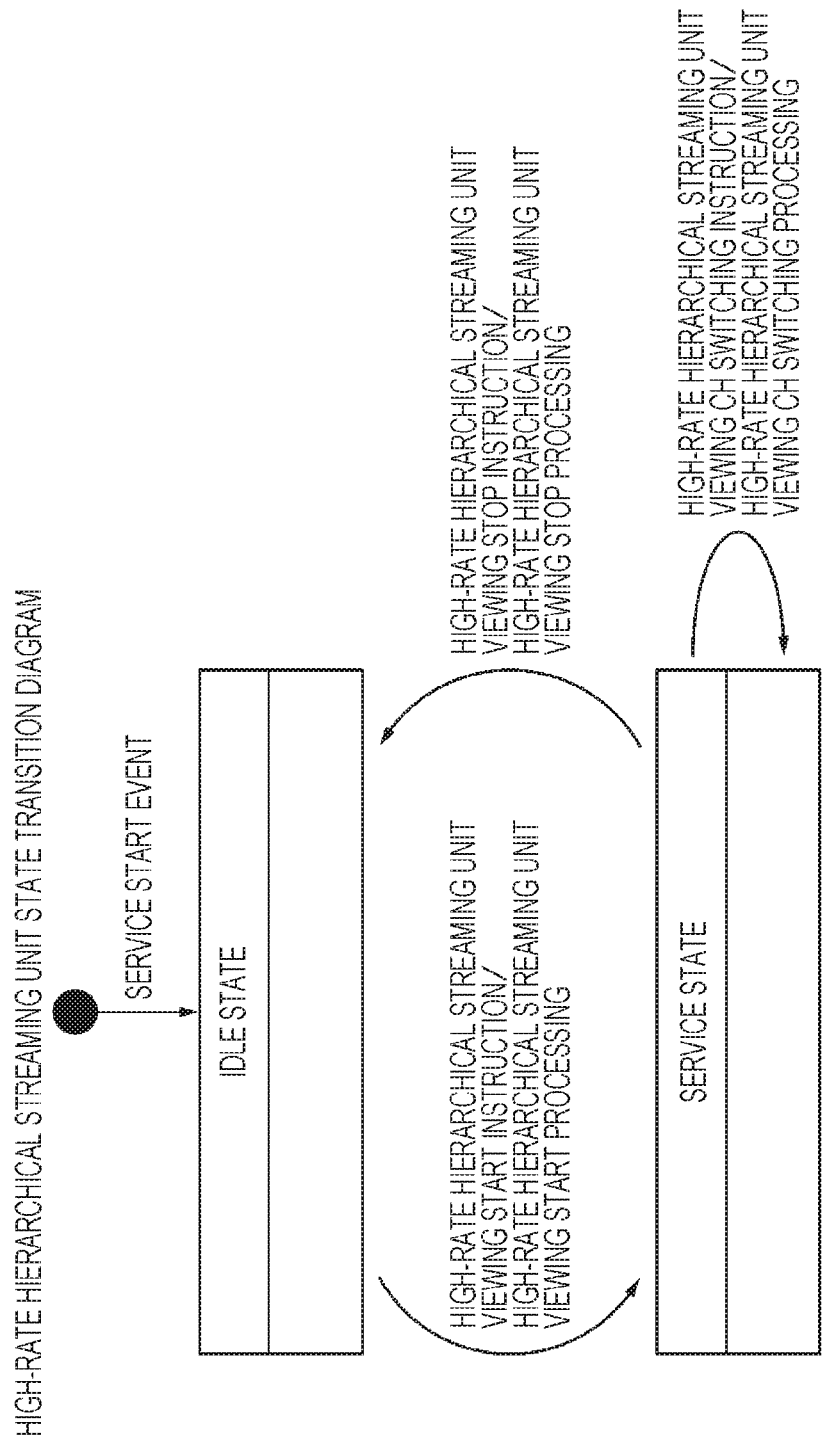
FIG. 28 is a state transition diagram of a high-rate hierarchical streaming unit.

FIG. 28 is a high-rate hierarchical streaming unit state transition diagram. A state transition occurs in response to an instruction issued through "user request processing". A transition is made between the idle state and a service state. The idle state is transited to the service state by the following processing.

High-rate hierarchical streaming unit viewing start instruction/High-rate hierarchical streaming unit viewing start processing The service state is transited to the idle state by the following processing.

High-rate hierarchical streaming unit viewing stop instruction/High-rate hierarchical streaming unit viewing stop processing The following processing in the service state causes a transition back to the service state.

Figure 29:
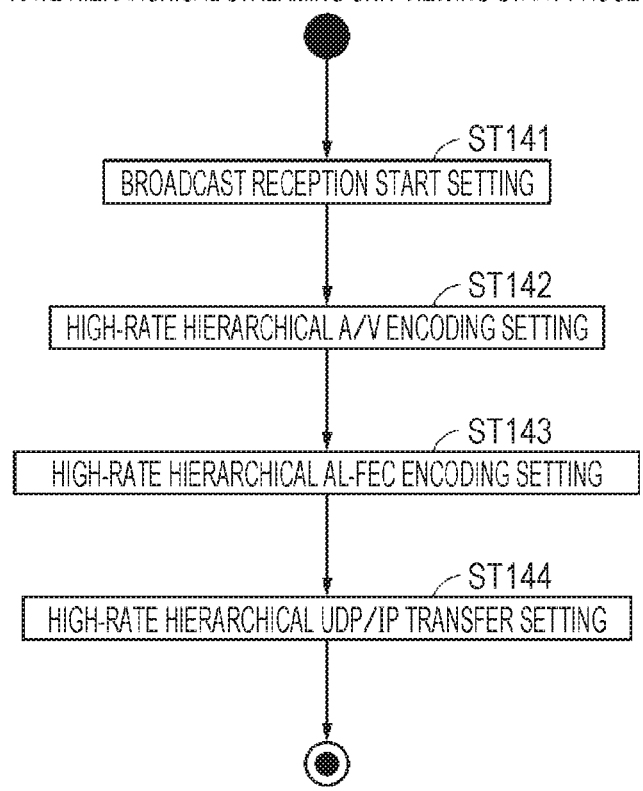
FIG. 29 is a flowchart illustrating high-rate hierarchical streaming unit viewing start processing.

High-rate hierarchical streaming unit viewing CH switching instruction/High-rate hierarchical streaming unit viewing CH switching processing The processing of the high-rate hierarchical streaming unit will be described. FIG. 29 illustrates the high-rate hierarchical streaming unit viewing start processing. This processing is carried out by sequentially performing the following items of processing.

Step ST141: Broadcast reception start setting

Step ST142: High-rate hierarchical A/V encoding setting

Step ST143: High-rate hierarchical AL-FEC encoding setting

Step ST144: High-rate hierarchical UDP/IP transfer setting

In step ST144, the streaming of the high-rate hierarchy is set so as to be transmitted by unicast individually to each terminal (sent to the individual addresses of the terminals).

Figure 30:
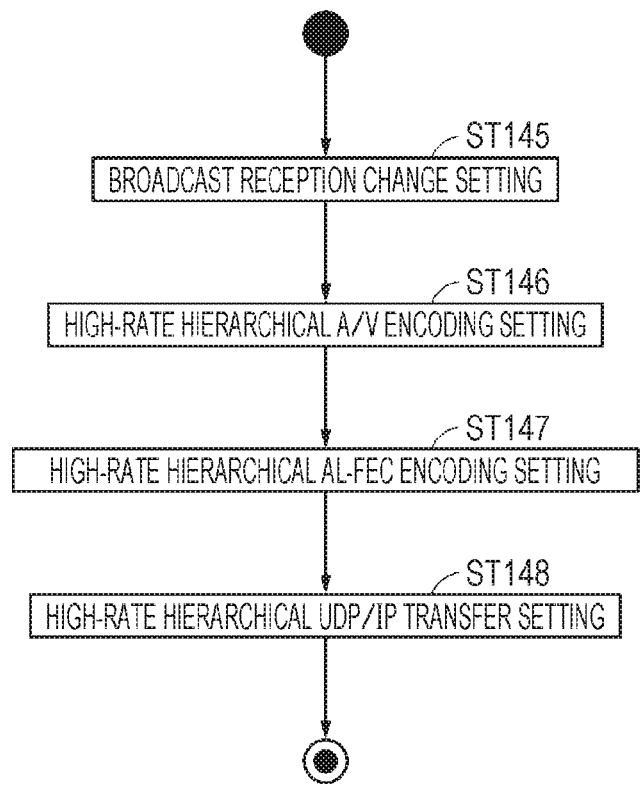
FIG. 30 is a flowchart illustrating high-rate hierarchical streaming unit viewing check switching processing.

FIG. 30 illustrates the high-rate hierarchical streaming unit viewing channel switching processing. This processing is carried out by sequentially performing the following items of processing.

Step ST145: Broadcast reception change setting

Step ST146: High-rate hierarchical A/V encoding setting

Step ST147: High-rate hierarchical AL-FEC encoding setting

Step ST148: High-rate hierarchical UDP/IP transfer setting

In step ST148, the streaming of the high-rate hierarchy is set so as to be transmitted by unicast individually to each terminal (sent to the individual addresses of the terminals).

Figure 31:
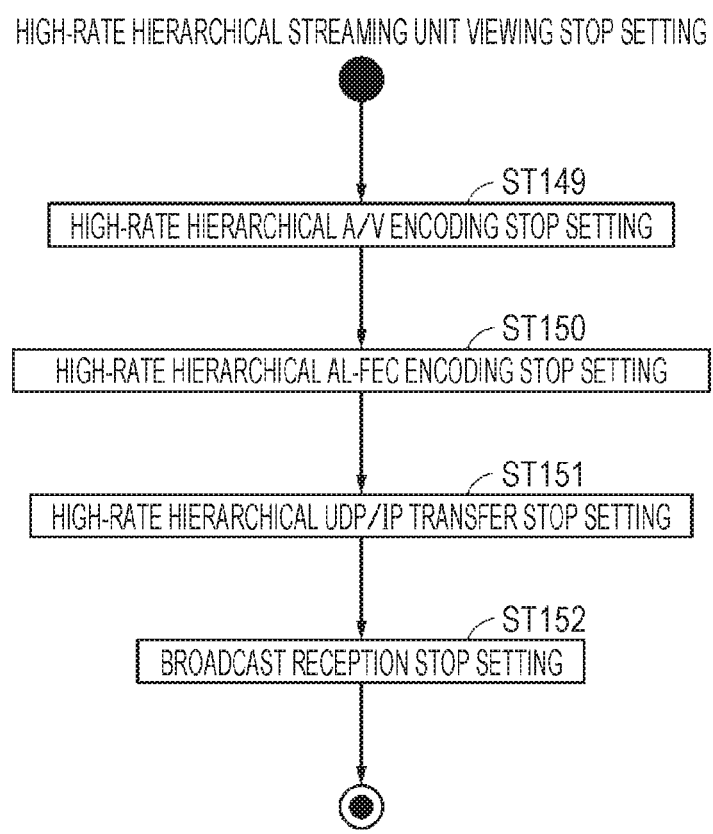
FIG. 31 is a flowchart illustrating high-rate hierarchical streaming unit viewing stop processing.

FIG. 31 illustrates processing for a high-rate hierarchical streaming unit viewing stop setting. This processing is carried out by sequentially performing the following items of processing.

Step ST149: High-rate hierarchical A/V encoding stop setting

Step ST150: High-rate hierarchical AL-FEC encoding stop setting

Step ST151: High-rate hierarchical UDP/IP transfer stop setting

Step ST152: Broadcast reception stop setting

"Processing of Terminal"

Figure 32:
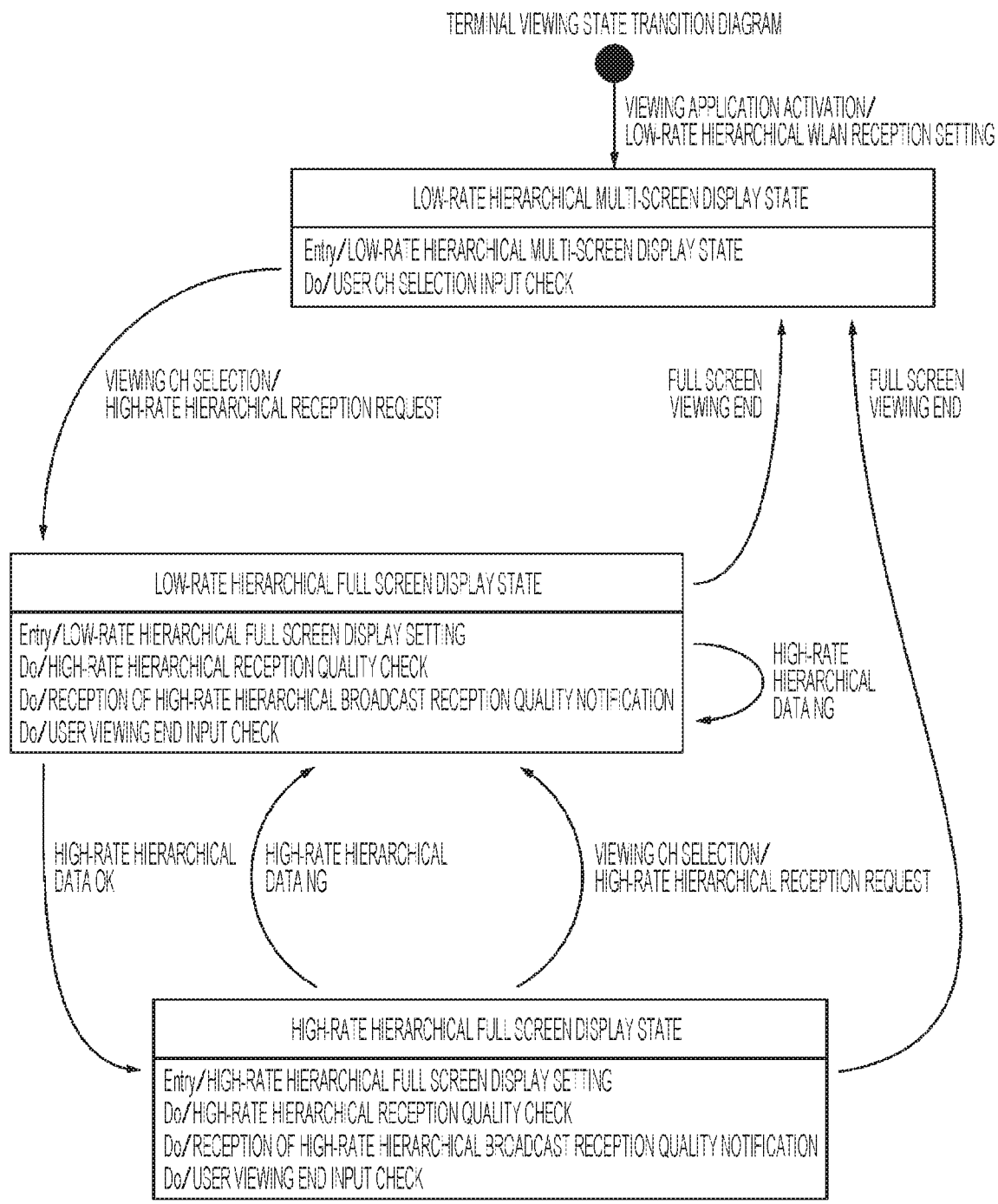
FIG. 32 is a state transition diagram of a terminal.

The processing of the terminal 102 of the second embodiment will be described. FIG. 32 is a viewing state transition diagram of the terminal 102. As illustrated in FIG. 32, the terminal 102 has three states, namely, "low-rate hierarchical multi-screen display state" contained in the name section, "low-rate hierarchical full screen display state" contained in the name section, and "high-rate hierarchical full screen display state" contained in the name section.

Figure 33A:
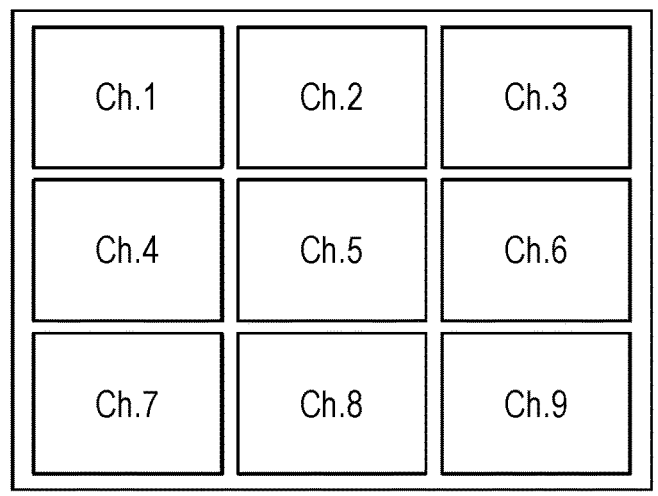
FIGS. 33A, 33B, and 33C are schematic diagrams illustrating a screen display.
Figure 33B:
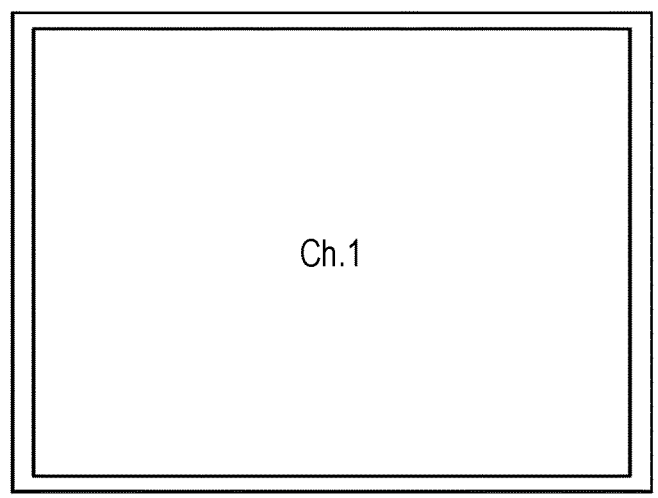
Figure 33C:
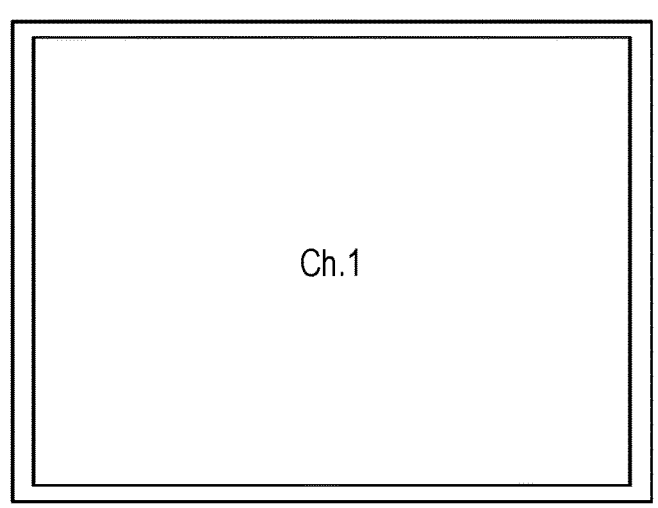

Displays illustrated in FIGS. 33A, 33B, and 33C are presented on the display unit of the terminal, in correspondence to the above-mentioned states. FIG. 33A illustrates the low-rate hierarchical multi-screen display. For example, one screen is divided into nine (3×3) screens and programs of different channels (1 to 9) are displayed on each of the divided screens. Since a stream in which the low-rate hierarchical data of all the channels is converted into the multi-screen is always streamed by multicast, the user can see the low-rate hierarchical multi-screen display at any time. Furthermore, a desired divided screen can be selected on the multi-screen display. A desired divided screen is selected by user input such as cursor operation (commander operation by remote control) and touch panel operation, whereby the viewing channel is selected.

FIG. 33B illustrates the low-rate hierarchical full screen display. When the user selects, for example, channel 1 on the multi-screen, the low-rate hierarchical full screen display of channel 1 is presented. The full screen display of the selected channel can be started immediately after the user selects the viewing channel. Furthermore, since the display is thereafter switched to the high-rate hierarchical streaming being transmitted by unicast, the high-rate hierarchical full screen display illustrated in FIG. 33C is presented. In addition to the user's channel selection, switching between the low-rate hierarchical streaming and the high-rate hierarchical streaming is automatically carried out depending on reception quality.

"Low-Rate Hierarchical Multi-Screen Display State"

This state is entered by viewing application activation/low-rate hierarchical WLAN reception setting. In "low-rate hierarchical multi-screen display state", the following processing is carried out.

Entry/Low-rate hierarchical multi-screen display state

Do/User CH selection input check

"Low-rate hierarchical multi-screen display state" is transited to "low-rate hierarchical full screen display state" by the following processing.

Viewing CH selection/High-rate hierarchical reception request

"Low-rate hierarchical full screen display state" is transited to the "low-rate hierarchical multi-screen display state" by processing for a full screen viewing end. In a case where the high-rate hierarchical data is no good (NG), the processing returns to the "low-rate hierarchical full screen display state".

"Low-Rate Hierarchical Full Screen Display State"

In "low-rate hierarchical full screen display state", the following processing is carried out.

Entry/Low-rate hierarchical full screen display setting

Do/High-rate hierarchical reception quality check

Do/Reception of high-rate hierarchical broadcast reception quality notification

Do/User viewing end input check

"Low-rate hierarchical full screen display state" is transited to "high-rate hierarchical full screen display state" when the high-rate hierarchical data is OK.

"High-rate hierarchical full screen display state" is transited to "low-rate hierarchical full screen display state" when the high-rate hierarchical data is NG or by the following processing.

Viewing CH selection/High-rate hierarchical reception request

"High-rate hierarchical full screen display state" is transited to "low-rate hierarchical multi-screen display state" by the processing for the full screen viewing end.

In "high-rate hierarchical full screen display state", the following processing is carried out.

Entry/High-rate hierarchical full screen display setting

Do/High-rate hierarchical reception quality check

Do/Reception of high-rate hierarchical broadcast reception quality notification

Do/User viewing end input check

Figure 34:
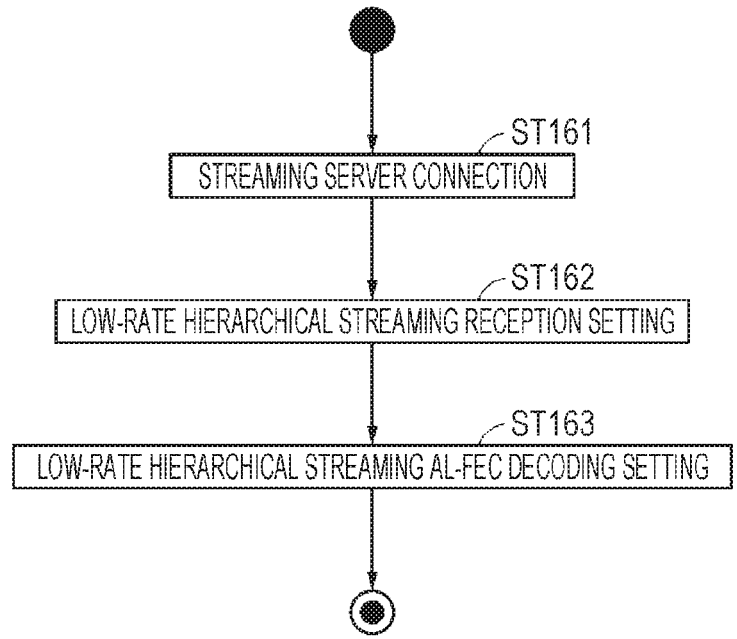
FIG. 34 is a flowchart illustrating processing for a low-rate hierarchical wireless LAN reception setting.

The processing of the terminal will be described. FIG. 34 illustrates processing for a low-rate hierarchical wireless LAN reception setting. This processing is carried out by sequentially performing the following items of processing.

Step ST161: Streaming server connection

Step ST162: Low-rate hierarchical streaming reception setting

Step ST163: Low-rate hierarchical streaming AL-FEC decoding setting

Figure 35:
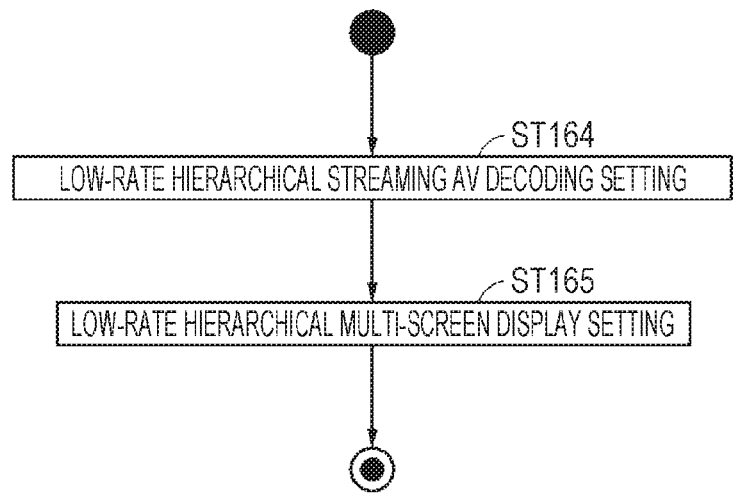
FIG. 35 is a flowchart illustrating processing for a low-rate hierarchical multi-screen display setting.

FIG. 35 illustrates processing for a low-rate hierarchical multi-screen display setting. This processing is carried out by sequentially performing the following items of processing.

Step ST164: Low-rate hierarchical streaming AV decoding setting

Step ST165: Low-rate hierarchical multi-screen display setting

Figure 36:
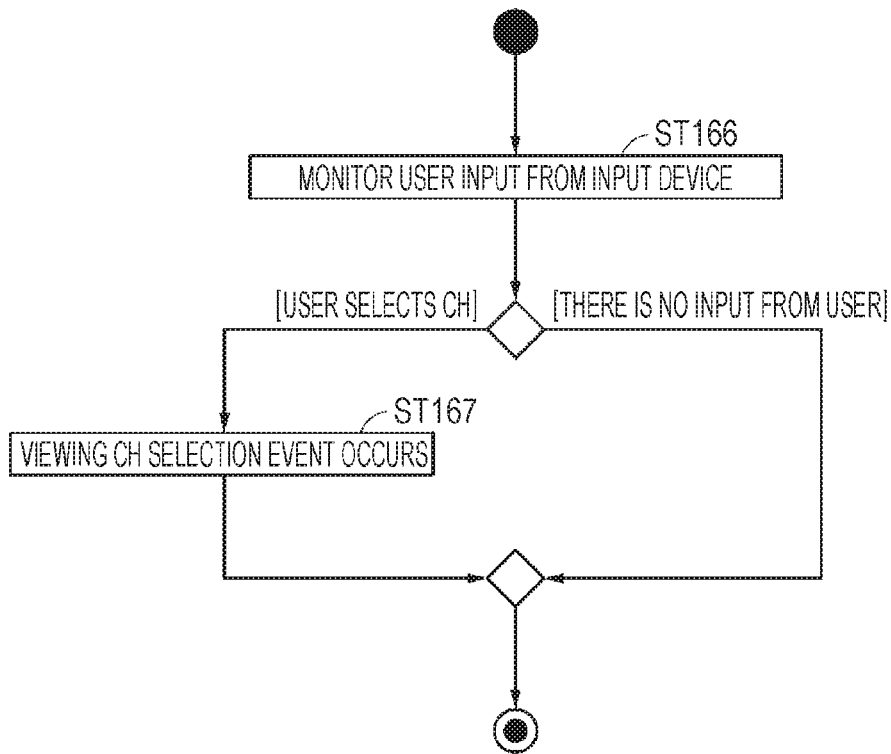
FIG. 36 is a flowchart illustrating processing for a user channel selection input check.

FIG. 36 illustrates processing for a user channel selection input check. This processing is carried out by sequentially performing the following items of processing.

Step ST166: User input from an input device is monitored.

Step ST167: In a case where the user input is channel selection, a viewing CH selection event occurs.

In a case where there is no input from the user, the processing ends.

Figure 37:
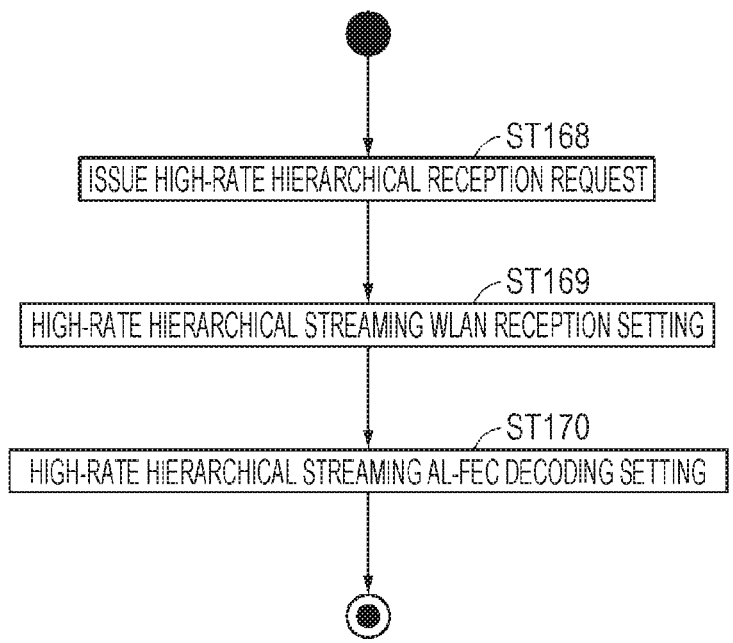
FIG. 37 is a flowchart illustrating processing for a high-rate hierarchical reception request.

FIG. 37 illustrates processing for a high-rate hierarchical reception request. This processing is carried out by sequentially performing the following items of processing.

Step ST168: Issuance of the high-rate hierarchical reception request

Step ST169: High-rate hierarchical streaming wireless LAN reception setting

Step ST170: High-rate hierarchical streaming AL-FEC decoding setting

Figure 38:
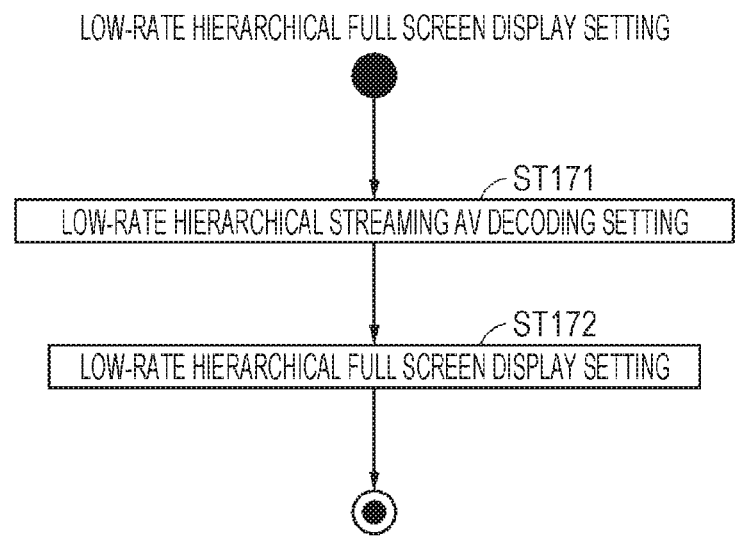
FIG. 38 is a flowchart illustrating processing for a low-rate hierarchical full screen display setting.

FIG. 38 illustrates processing for a low-rate hierarchical full screen display setting. This processing is carried out by sequentially performing the following items of processing.

Step ST171: Low-rate hierarchical streaming AV decoding setting

Step ST172: Low-rate hierarchical full screen display setting

Figure 39:
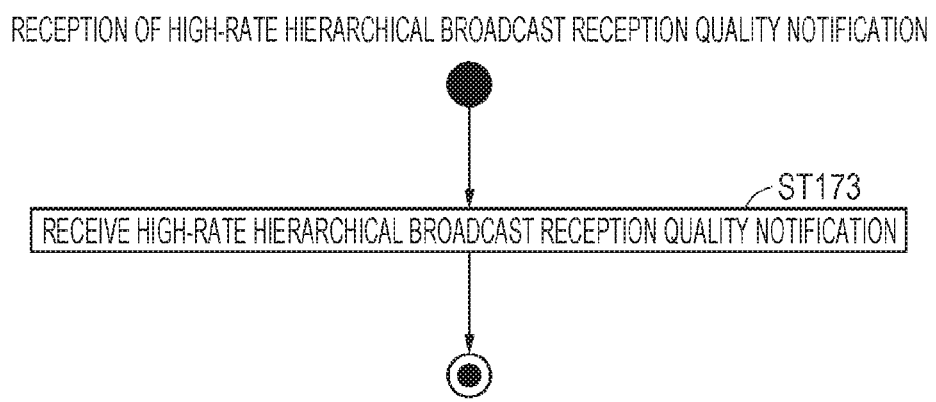
FIG. 39 is a flowchart illustrating reception processing for a high-rate hierarchical broadcast reception quality notification.

FIG. 39 illustrates reception processing for a high-rate hierarchical broadcast reception quality notification. This processing is carried out by performing the following processing.

Figure 40:
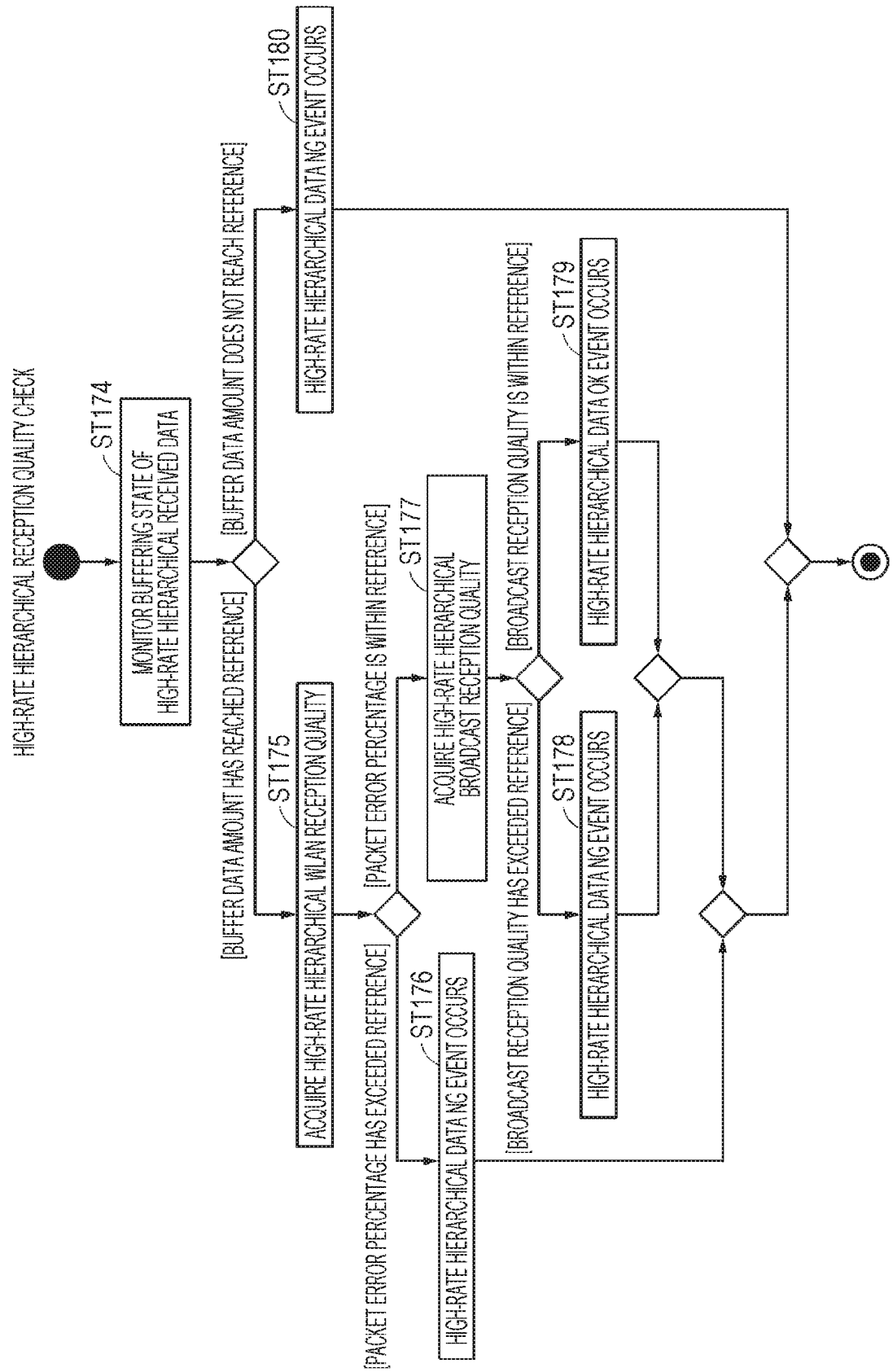
FIG. 40 is a flowchart illustrating a high-rate hierarchical reception quality check.

Step ST173: Reception of the high-rate hierarchical broadcast reception quality notification FIG. 40 illustrates processing for a high-rate hierarchical reception quality check. This processing is carried out by sequentially performing the following items of processing.

Step ST174: A buffering state of high-rate hierarchical received data is monitored.

Step ST175: In a case where a buffer data amount has reached a reference, high-rate hierarchical wireless LAN reception quality is acquired.

Step ST176: Since a packet error percentage exceeds a reference, a high-rate hierarchical data NG event occurs and the processing ends.

Step ST177: In a case where the packet error percentage is within the reference, acquisition of the high-rate hierarchical broadcast reception quality is acquired.

Step ST178: Since the broadcast reception quality exceeds a reference (when the quality is inferior to the reference), the high-rate hierarchical data NG event occurs and the processing ends.

For example, a packet error rate or a signal to noise ratio (SNR) of MPEG2-TS can be used as the reference.

Step ST179: In a case where the broadcast reception quality is within the reference, a high-rate hierarchical data OK event occurs and the processing ends.

Step ST180: In a case where the buffer data amount does not reach the reference, the processing ends.

As described above, the second embodiment detects whether the data of the high-rate hierarchy can be used by considering both the reception quality of the wireless LAN (for example, the packet error percentage) and the broadcast reception quality. The high-rate hierarchical data OK event occurs in a case where the data can be used and the high-rate hierarchical data NG event occurs in a case where this data cannot be used.

Figure 41:
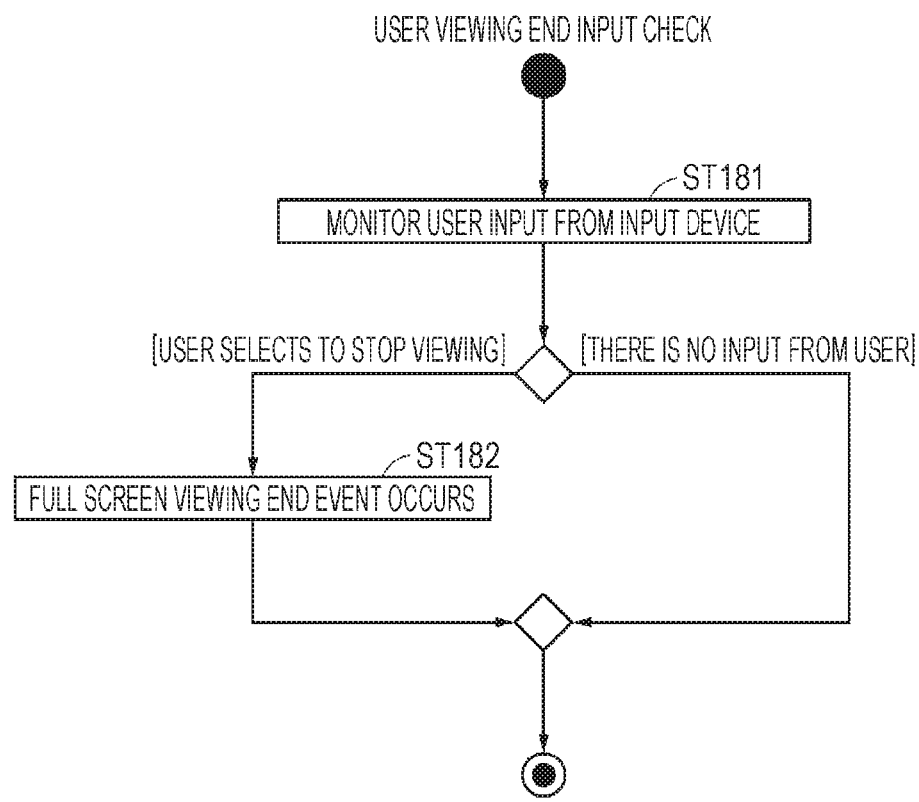
FIG. 41 is a flowchart illustrating processing for a user viewing end input check.

FIG. 41 illustrates processing for a user viewing end input check. This processing is carried out by sequentially performing the following items of processing.

Step ST181: User input from an input device is monitored.

Step ST182: In a case where the user input is a viewing stop, a full screen viewing end event occurs. In a case where there is no input from the user, the processing ends.

Figure 42:
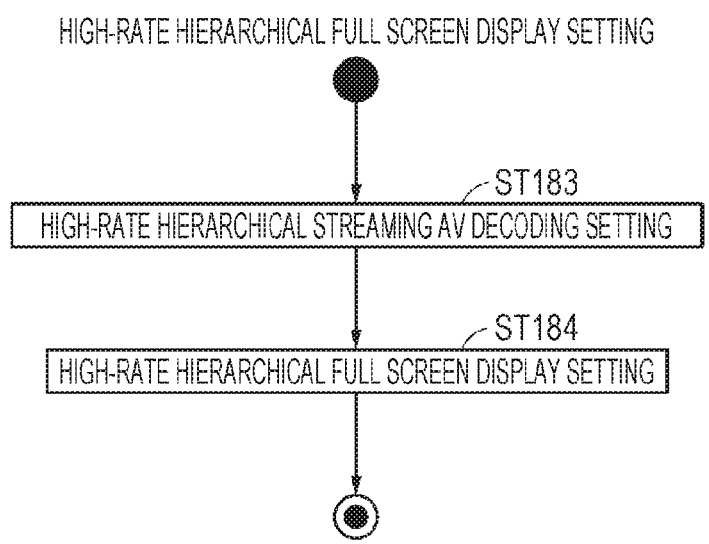
FIG. 42 is a flowchart illustrating processing for a high-rate hierarchical full screen display setting.

FIG. 42 illustrates processing for a high-rate hierarchical full screen display setting. This processing is carried out by sequentially performing the following items of processing.

Step ST183: High-rate hierarchical streaming A/V decoding setting

Step ST184: High-rate hierarchical full screen display setting

"User Interface Additional Information"

In the above-described second embodiment, the low-rate hierarchical multi-screen display is shown to the user as illustrated in FIG. 33A such that the user selects a divided screen corresponding to a desired channel, whereby the channel is selected. On the low-rate hierarchical multi-screen display, user interface additional information may be displayed in addition to the images of the programs as illustrated in FIG. 33A. As a display method, it is possible to display the additional information using a part of the divided screen or to display the additional information in the vicinity of the divided screen.

The followings are possible as the user interface additional information.

Related information display: Program information (overview, casts), program end time information Navigation information (traffic jam information, route information, arrival time)

Town information (neighborhood shops, spots, parking lots)

Meteorological conditions (weather, temperature, humidity)

Display of a video of a dashboard camera

Recommendation function: Sending recommended programs to other passengers

Introducing programs that can be viewed until arriving at the destination

Introducing programs that become viewable in the middle of traveling (local programs)

Introducing programs currently being viewed in the car

Viewing support: A function to record a viewing program on a recorder when viewing of this program can be no longer continued because of, for example, arrival at the destination A function allowing to freely select the number of displayed programs and the sizes and positions thereof on the multi-screen A support function for tuning, where a terminal possessed by the parent has the privilege of tuning the child's terminal (selecting a program for the child to view, parental control)

Image quality control other than viewing quality (premium members, the number of viewers, majority voting scheme, auction)

Terminal Specifications

Note that the present technology can be also configured as described below.

(1)

A communication apparatus including:

an encoder with a plurality of channels configured to encode an input stream while switching a rate of output data in at least two stages; and a wireless communication apparatus that transfers output of the encoder to a terminal by way of a wireless communication network, in which when a channel is selected at the terminal, output of the encoder is switched from a low-rate stream to a high-rate stream such that the high-rate stream is transmitted to the terminal at which the channel has been selected.

(2)

The communication apparatus according to (1), in which the input stream is data of digital broadcasting.

(3)

The communication apparatus according to (1), in which the high-rate stream is transmitted by multicast or unicast.

(4)

The communication apparatus according to any one of (1) to (3), in which the low-rate stream is transmitted during a period other than a transmission period of the high-rate stream.

(5)

A communication apparatus including:

a wireless communication apparatus that receives a stream transferred from a server by way of a wireless communication network;

a decoder that decodes a received stream;

a display unit that displays a decoded stream; and a control unit that transfers information regarding channel selection to the server and switches a parameter of the decoder such that a low-rate stream or a high-rate stream transmitted from the server is decoded.

(6)

A communication apparatus including:

a first streaming unit that encodes an input stream into a low-rate stream including user interface information;

a second streaming unit that encodes an input stream into a high-rate stream;

a wireless communication apparatus that transfers output of the first streaming unit and the second streaming unit to a terminal by way of a wireless communication network; and a control unit that, when a channel is selected at the terminal using the user interface information while the low-rate stream is being transmitted, controls such that the high-rate stream of the selected channel from the second streaming unit is transmitted to the terminal.

(7)

The communication apparatus according to (6), in which the input stream is data of digital broadcasting.

(8)

The communication apparatus according to (6) or (7), in which the low-rate stream is transmitted by multicast and the high-rate stream is transmitted by unicast.

(9)

The communication apparatus according to (6) or (7), in which the user interface information is a multi-screen display that displays images of a plurality of selectable channels on divided screens.

(10)

The communication apparatus according to (9), in which additional information is displayed on the multi-screen display.

(11)

The communication apparatus according to (6), in which the first streaming unit always performs encoding processing.

(12)

A communication apparatus including:

a wireless communication apparatus that receives one of a low-rate stream and a high-rate stream transferred from a server by way of a wireless communication network;

a decoder that decodes the low-rate stream and the high-rate stream that have been received;

a display unit that displays a decoded stream; and a control unit that controls such that a channel selection screen is displayed on the display unit according to user interface information included in the low-rate stream, information regarding channel selection made using the channel selection screen is transferred to the server, and the high-rate stream transmitted from the server is decoded.

(13)

The communication apparatus according to (12), in which the control unit controls such that a full screen by the low-rate stream is displayed during a transition period from the channel selection screen until a screen by the high-rate stream is displayed.

(14)

The communication apparatus according to (12), in which reception quality of the high-rate stream is judged on the basis of information regarding reception quality of the input stream and quality of wireless communication and a stream to be decoded is selected while a screen by the high-rate stream is being displayed.

(15)

The communication apparatus according to (12), in which the input stream is data of digital broadcasting.

<3. Modification>

The embodiments according to the present technology have been specifically described thus far. However, the present technology is not limited to the aforementioned respective embodiments and various modifications based on the technological spirit of the present technology can be made. For example, the rate of the stream is not limited to two kinds and three or more kinds of rates may be allowed to be set. In addition, the present technology may be applied to the case of distributing image data other than data of the digital broadcasting.

Furthermore, the configurations, methods, processes, shapes, materials, numerical values, and the like of the above-described embodiments can be combined with each other as long as they do not deviate from the gist of the present technology.

REFERENCE SIGNS LIST

1 Streaming server
2, $2_1$ to $2_m$ Terminal
3, 103 Wireless communication network
4, 104 Antenna unit
5, 105 Tuner unit
10, 110 User
11, $11_1$ to $11_n$ Streaming unit
12, 24 A/V decoder
13 A/V encoder
14, 23 AL-FEC encoder
15, 22 UDP/IP15
16, 21 Wireless LAN interface
17, 26 Control unit

The invention claimed is:

1. A communication apparatus, comprising:
   at least one tuner configured to receive at least one input stream;
   at least one encoder configured to encode the at least one input stream based on switch of a rate of output data in at least two stages, wherein the output data is associated with the at least one encoder;
   a wireless communication apparatus configured to transfer the output data of the at least one encoder to a terminal via a wireless communication network; and
   a central processing unit (CPU) configured to:
      receive, based on a selection of a channel at the terminal, a notification to change the rate of the output data;
      acquire, based on a packet error value of the wireless communication network that is less than a first threshold value, a reception quality of the at least one input stream;
      acquire, based on a buffer data amount that exceeds a threshold data amount, a reception quality of a high-rate stream of the output data, wherein
         the reception quality of the high-rate stream is acquired from the terminal,
         the terminal determines the reception quality of the high-rate stream based on the reception quality of the at least one input stream and a specific quality of the wireless communication network, and
         the buffer data amount is associated with the high-rate stream;
      switch the output data of the at least one encoder from a low-rate stream to the high-rate stream based on:
         the received notification,
         the reception quality of the high-rate stream, and
         the acquired reception quality of the at least one input stream being less than a second threshold value; and
      control, based on the switch of the output data of the at least one encoder, the wireless communication apparatus to transmit the high-rate stream to the terminal at which the channel is selected.

2. The communication apparatus according to claim 1, wherein the at least one input stream corresponds to digital broadcasting data.

3. The communication apparatus according to claim 1, wherein the CPU is further configured to control the wireless communication apparatus to transmit the high-rate stream by one of multicast or unicast.

4. The communication apparatus according to claim 1, wherein the CPU is further configured to:

control the wireless communication apparatus to transmit the low-rate stream to the terminal in a first time period; and control the wireless communication apparatus to transmit the high-rate stream to the terminal in a second time period, wherein the second time period is different from the first time period.

5. A communication apparatus, comprising:

a wireless communication apparatus configured to receive a low-rate stream from a server via a wireless communication network;

a decoder configured to decode the received low-rate stream;

a display screen configured to display the decoded low-rate stream; and a central processing unit (CPU) configured to:
control the wireless communication apparatus to transfer information regarding selection of a channel to the server;
control, based on the information, the wireless communication apparatus to transfer a first notification to the server to change a rate of output data;
receive a high-rate stream from the server based on the transferred first notification;
determine a reception quality of an input stream;
determine a reception quality of the high-rate stream based on the reception quality of the input stream and a specific quality of the wireless communication network, wherein
the server acquires, based on a buffer data amount that exceeds a threshold data amount, the determined reception quality of the high-rate stream,
the server acquires, based on a packet error value of the wireless communication network that is less than a first threshold value, the determined reception quality of the input stream, and
the buffer data amount is associated with the high-rate stream;
receive a second notification from the server based on:
the determined reception quality of the high-rate stream, and
the determined reception quality of the input stream being less than a second threshold value;
switch a parameter of the decoder based on the transferred first notification and the received second notification, wherein the decoder is configured to decode the received high-rate stream based on the switch of the parameter; and
control the display screen to display the decoded high-rate stream.

6. A communication apparatus, comprising:

at least one tuner configured to receive at least one input stream;

a first encoder configured to encode an input stream of the at least one input stream into a low-rate stream, wherein the low-rate stream includes user interface information;

a second encoder configured to encode the input stream into a high-rate stream;

a wireless communication apparatus configured to transfer one of output of the first encoder or output of the second encoder to a terminal via a wireless communication network; and a central processing unit (CPU) configured to:
control the wireless communication apparatus to transmit the low-rate stream to the terminal;
receive, based on a selection of a channel at the terminal, a notification to change a rate of output data, wherein the selection of the channel is based on the user interface information and the transmission of the low-rate stream;
acquire, based on a packet error value of the wireless communication network that is less than a first threshold value, a reception quality of the at least one input stream;
acquire, based on a buffer data amount that exceeds a threshold data amount, a reception quality of the high-rate stream from the terminal, wherein
the terminal determines the reception quality of the high-rate stream based on the reception quality of the at least one input stream and a specific quality of the wireless communication network, and
the buffer data amount is associated with the high-rate stream; and
control the wireless communication apparatus, to transmit the high-rate stream to the terminal, based on:
the received notification,
the reception quality of the high-rate stream, and
the acquired reception quality of the at least one input stream being less than a second threshold value,
wherein the high-rate stream corresponds to the selected channel.

7. The communication apparatus according to claim 6, wherein the at least one input stream corresponds to digital broadcasting data.

8. The communication apparatus according to claim 6, wherein the CPU is further configured to control the wireless communication apparatus to:
transmit the low-rate stream by multicast; and
transmit the high-rate stream by unicast.

9. The communication apparatus according to claim 6, wherein
a display screen of the terminal displays the user interface information as a multi-screen display, and
the multi-screen display includes images of a plurality of selectable channels on divided screens.

10. The communication apparatus according to claim 9, wherein the multi-screen display includes additional information related to at least one of weather, temperature, or humidity.

11. A communication apparatus, comprising:

a wireless communication apparatus configured to receive, via a wireless communication network, a low-rate stream transferred from a server;

a decoder configured to decode the low-rate stream, wherein the low-rate stream includes user interface information;

a display screen configured to display the decoded low-rate stream; and a central processing unit (CPU) configured to:
control the display screen to display a channel selection screen based on the user interface information;
control the wireless communication apparatus to transfer information to the server, wherein the information is associated with a selection of a channel on the channel selection screen;
control, based on the information, the wireless communication apparatus to transfer a first notification to the server to change a rate of output data;
receive, via the wireless communication network, a high-rate stream from the server based on the transferred first notification;
determine a reception quality of an input stream;

determine a reception quality of the high-rate stream based on the reception quality of the input stream and a specific quality of the wireless communication network, wherein
- the server acquires, based on a buffer data amount that exceeds a threshold data amount, the determined reception quality of the high-rate stream,
- the server acquires, based on a packet error value of the wireless communication network that is less than a first threshold value, the determined reception quality of the input stream, and
- the buffer data amount is associated with the high-rate stream;

receive a second notification from the server based on:
the determined reception quality of the high-rate stream, and
the determined reception quality of the input stream being less than a second threshold value; and
switch, based on the transferred first notification and the received second notification, a parameter of the decoder, wherein the decoder is configured to decode the received high-rate stream based on the switch of the parameter of the decoder.

12. The communication apparatus according to claim 11, wherein the CPU is further configured to control the display screen to display the low-rate stream in a full screen in a transition period from the display of the channel selection screen until the display of the decoded high-rate stream.

13. The communication apparatus according to claim 11, wherein the low-rate stream and the high-rate stream correspond to digital broadcasting data.

* * * * *